(12) United States Patent  
Heikenfeld

(10) Patent No.: US 9,211,490 B2  
(45) Date of Patent: Dec. 15, 2015

(54) ELECTROFLUIDIC TEXTILES AND CLEANING IMPLEMENTS USING SUCH ELECTROFLUIDIC TEXTILES

(71) Applicant: The University of Cincinnati, Cincinnati, OH (US)

(72) Inventor: Jason C. Heikenfeld, New Richmond, OH (US)

(73) Assignee: University of Cincinnati, Cincinnati, OH (US)

( * ) Notice: Subject to any disclaimer, the term of this patent is extended or adjusted under 35 U.S.C. 154(b) by 0 days.

(21) Appl. No.: 13/657,155

(22) Filed: Oct. 22, 2012

(65) Prior Publication Data

US 2013/0092543 A1  Apr. 18, 2013

Related U.S. Application Data

(62) Division of application No. 11/464,988, filed on Aug. 16, 2006, now Pat. No. 8,308,927.

(60) Provisional application No. 60/709,026, filed on Aug. 17, 2005.

(51) Int. Cl.
| | |
|---|---|
| *B01D 35/06* | (2006.01) |
| *A47L 13/16* | (2006.01) |
| *A47L 13/20* | (2006.01) |
| *A47L 13/40* | (2006.01) |
| *B32B 5/26* | (2006.01) |

(52) U.S. Cl.
CPC ............... *B01D 35/06* (2013.01); *A47L 13/16* (2013.01); *A47L 13/20* (2013.01); *A47L 13/40* (2013.01); *B32B 5/26* (2013.01)

(58) Field of Classification Search
CPC ....... D21H 13/50; D21H 13/48; D06M 17/00; D03D 15/00; D03D 15/15; D03D 15/0066; D03D 15/0077; D03D 15/0083; A47L 13/16; A47L 13/20; A47L 13/40; B01D 35/06; B32B 5/26
USPC .................. 204/400, 660, 600, 663; 205/775; 15/1.51, 1.52, 1.7, 228, 209, 208; 134/1, 6; 442/268, 354, 377
See application file for complete search history.

(56) References Cited

U.S. PATENT DOCUMENTS

| | | | |
|---|---|---|---|
| 4,929,803 A | | 5/1990 | Yoshida et al. |
| 5,135,479 A | * | 8/1992 | Sibalis et al. .................. 604/20 |
| 6,842,936 B2 | | 1/2005 | Policicchio et al. |
| 7,028,364 B2 | | 4/2006 | Policicchio et al. |
| 7,048,804 B2 | | 5/2006 | Kisela et al. |
| 2003/0009839 A1 | | 1/2003 | Streutker et al. |
| 2003/0028988 A1 | | 2/2003 | Streutker et al. |
| 2003/0106568 A1 | | 6/2003 | Keck et al. |
| 2004/0055891 A1 | | 3/2004 | Pamula et al. |

(Continued)

FOREIGN PATENT DOCUMENTS

| | | | | |
|---|---|---|---|---|
| DE | 10245243 | * | 3/2004 | ............ B01D 61/56 |
| WO | 03045556 A2 | | 6/2003 | |
| WO | 2005096065 A1 | | 10/2005 | |

*Primary Examiner* — Gurpreet Kaur
(74) *Attorney, Agent, or Firm* — Wood, Herron & Evans, LLP

(57) ABSTRACT

The invention relates to textiles, reservoirs, or films which may be switchably rendered hydrophilic or hydrophobic for liquid wicking, repelling, moving, holding, absorbing, drying, wetting, dispensing, and other means of electrically manipulation of liquids.

8 Claims, 17 Drawing Sheets

(56) References Cited

U.S. PATENT DOCUMENTS

| | | |
|---|---|---|
| 2004/0057176 A1 | 3/2004 | Dhawan et al. |
| 2004/0107522 A1 | 6/2004 | Paas |
| 2004/0128786 A1 | 7/2004 | Policicchio et al. |
| 2004/0139572 A1 | 7/2004 | Kisela et al. |
| 2005/0011536 A1 | 1/2005 | Hofte et al. |
| 2005/0022843 A1 | 2/2005 | Policicchio et al. |
| 2005/0060827 A1 | 3/2005 | James et al. |
| 2005/0076936 A1 | 4/2005 | Pung et al. |
| 2006/0000041 A1 | 1/2006 | Streutker et al. |
| 2006/0016037 A1 | 1/2006 | Flora et al. |
| 2006/0065290 A1 | 3/2006 | Broz et al. |

* cited by examiner

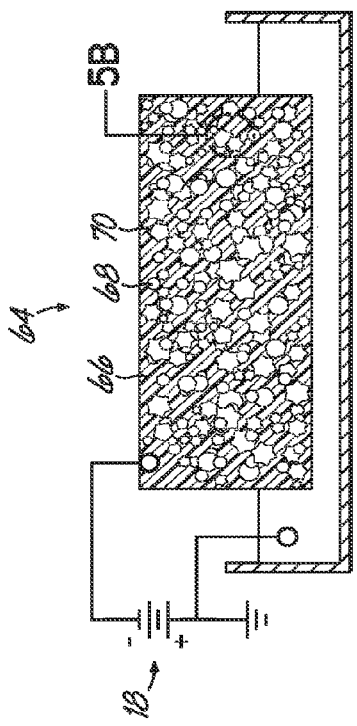
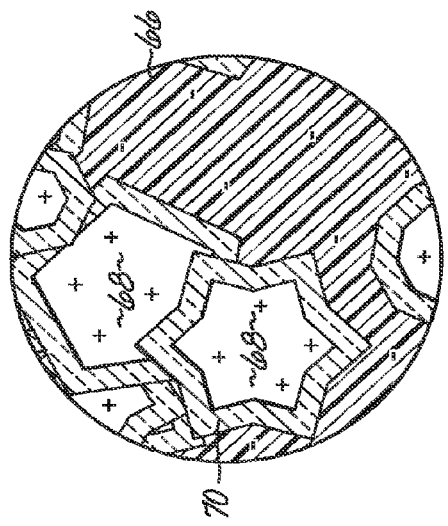
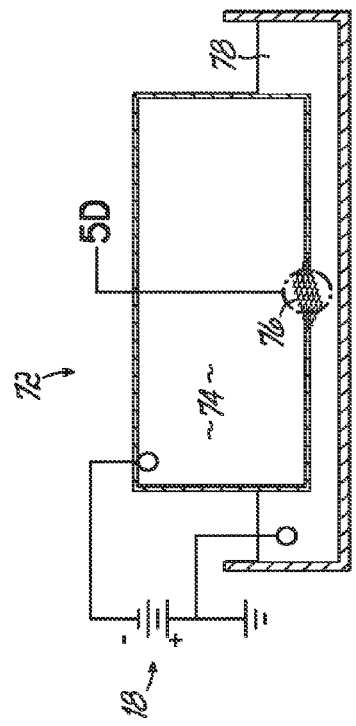
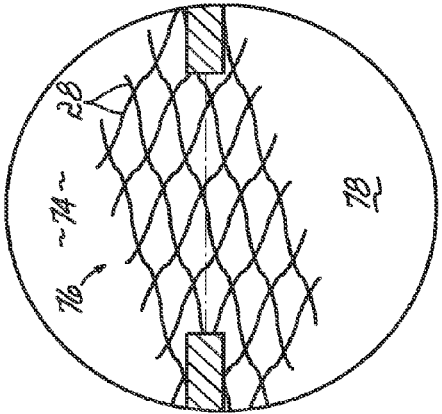

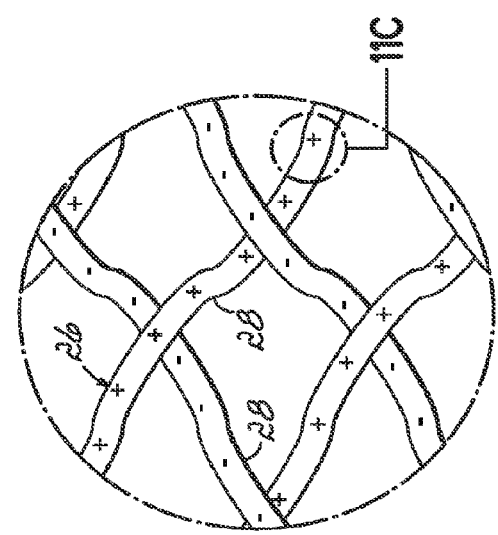
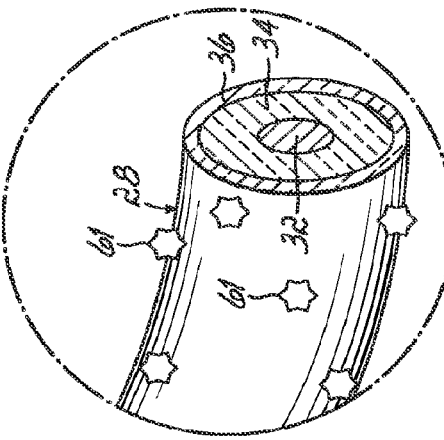
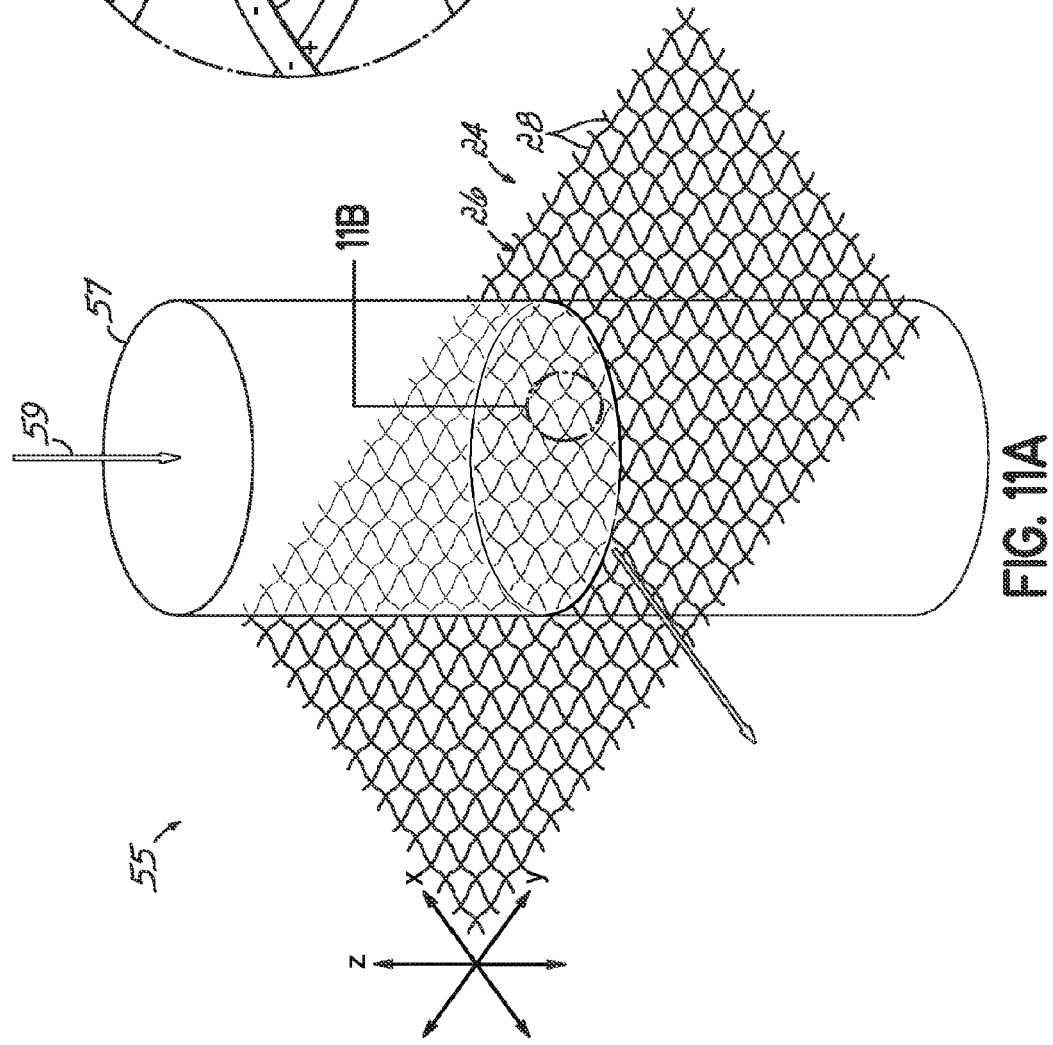
FIG. 11B
FIG. 11C
FIG. 11A

ELECTROFLUIDIC TEXTILES AND CLEANING IMPLEMENTS USING SUCH ELECTROFLUIDIC TEXTILES

CROSS REFERENCE TO RELATED APPLICATIONS

This application is related to and claims the benefit of U.S. Non-Provisional patent application Ser. No. 11/464,988, filed on Aug. 16, 2006, which in turn claims the benefit of U.S. Provisional Patent Application Ser. No. 60/709,026, filed on Aug. 17, 2005, the disclosures of which are incorporated herein by reference.

FIELD OF THE INVENTION

The invention relates to textiles, reservoirs, or films which may be switched between hydrophilic or hydrophobic states for liquid wicking, repelling, moving, holding, absorbing, drying, wetting, dispensing, and other means of electrically manipulating liquids.

BACKGROUND OF THE INVENTION

Cleaning implements for dry or wet cleaning of hard surfaces, such as ceramic tile floors, hardwood floors, counter tops and the like, are well known in the art. Examples of such cleaning implements include SWIFFER®, SWIFFER WETJET® and SWIFFER SPRAY & CLEAN® commercially available from the Procter & Gamble Company (Cincinnati, Ohio). These particular cleaning implements, which generally include a head and a handle connected to the head, are used in conjunction with a disposable cleaning sheet coupled with the head. These particular cleaning implements and similar cleaning implements are specifically designed for convenient and easy cleaning of hard surfaces.

Although conventional cleaning implements are adequate in many situations, there is a constant consumer need for cleaning implements characterized by improved functionality.

SUMMARY OF THE INVENTION

In accordance with the principles of the invention, textiles, reservoirs, or films may be switchably rendered hydrophilic or hydrophobic upon application of voltage. These electrofluidic textiles are then capable of liquid wicking, repelling, moving, holding, absorbing, drying, wetting, dispensing, and other means of electrically manipulating liquids.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 5A is a diagrammatic view of an electrofluidic textile reservoir in accordance with an embodiment of the invention;

FIG. 5B is an enlarged view of a portion of FIG. 5A;

FIG. 5C is a diagrammatic view of an electrofluidic textile reservoir in accordance with an embodiment of the invention;

FIG. 5D is an enlarged view of a portion of FIG. 5C;

FIG. 11A is a diagrammatic view of a self-cleaning electrofluidic textile filtration device in accordance with an embodiment of the invention;

FIG. 11B is an enlarged view of a portion of FIG. 11A;

FIG. 11C is an enlarged view in partial cross-section of one of the fibers shown in FIG. 11B in which a filtered substance is visible;

DETAILED DESCRIPTION

Although the invention will be described next in connection with certain embodiments, the description of the invention is intended to cover all alternatives, modifications, and equivalent arrangements as may be included within the spirit and scope of the invention as defined by the appended claims. In particular, those skilled in the art will recognize that the components of electrofluidic textiles described herein could be arranged in multiple different ways.

Electrowetting on electrical insulators underlies the physical mechanism for primary embodiment of the invention. Electrowetting is a preferred method since electrowetting provides high-speed operation (milliseconds), low power capacitive operation (~pF/cm$^2$ to ~nF/cm$^2$) and excellent reversibility. However, alternative embodiments of the invention include other liquid manipulation methods well-known by those skilled in the art of microfluidics. These alternative methods include but are not limited to: electrowetting without insulators, thermocapillary, photo-response, electro-osmosis, redox-active surfactants, and micro-electro-mechanical pumping. In particular, electrowetting without insulators may be preferred for applications such as those not requiring reversibility of wetting. For all such embodiments, the electrical insulator may be partly or entirely removed from the invention described herein.

A Cartesian coordinate system will be used to define specific directions and orientations. References to terms such as 'above' and 'below' are for convenience of description only and represent only one possible frame of reference for describing the invention. The dimensions of devices described herein cover a wide range of sizes from nanometers to meters based on a particular end application.

The term "liquid" is used herein to describe any material or combination of materials that is not solid, plasma, or gaseous in physical state. The term "liquid" is not confining to any particular composition, viscosity, or surface tension and may be used interchangeably with terms such as fluid, gel, paste, cream, waste, or other terms obvious within the scope of the invention. However, the liquid may comprise a liquid cleaning composition. Similarly, the term "fiber" is used herein and understood by its conventional meaning while also being interchangeable with terms like wire, filament, string, cable, or other terms obvious within the scope of the invention. The term "fibers" may include any woven or non-woven web including porous material, such as a film with punched holes or laser-cut holes.

Figure 1A:
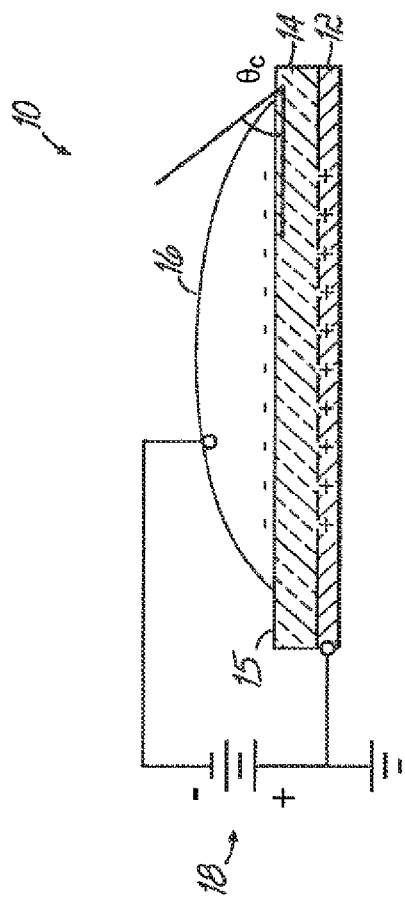
FIGS. 1A-D are cross-sectional views of an electrowetting textile in accordance with an embodiment of the invention.
Figure 1B:
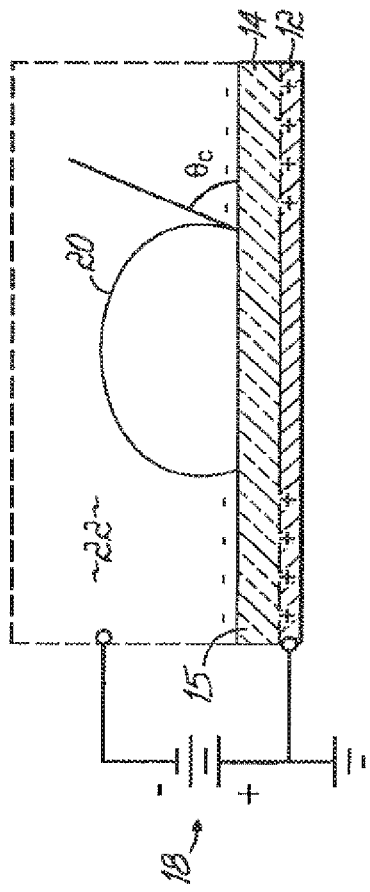

With reference to FIG. 1A, a simple electrowetting textile 10 consists of an electrode 12 and an electrical insulator 14. In the absence of an applied voltage, the insulator 14 is not strongly hydrophilic. As a result, a volume of a polar liquid 16, such as water, does not fully wet a contacted surface 15 of the insulator 14. As shown in FIG. 1B, a voltage may be applied from a voltage source 18 between the polar liquid 16 and the electrode 12, which causes the polar liquid 16 to further wet the surface 15 of the insulator 14 via the principles of electrowetting.

Applying voltage modifies the net interfacial surface tension forces and mechanical forces experienced by the polar liquid 16, which causes surface wetting. As known, increased surface wetting is evidenced through movement of liquids and/or a decrease in liquid contact angle ($\theta$). Because electrowetting is charge mediated, the voltage source 18 may be removed and the built-up charge across the electrical insulator 14 will remain along with the electrically induced liquid attracting forces. If the electrode 12 and polar liquid 16 are electrically shorted together, the charge is then dissipated and the polar liquid returns to the configuration shown in FIG. 1A.

In alternative embodiments of the invention, the insulator 14 may be physically altered such that wetting is irreversible and preserved even after charge dissipation. The electrode 12 may directly supply charge to the polar liquid 16 or may capacitively charge the insulator 14 through a second electrical insulator (not shown). The insulator 14 may also contain charge trapping materials and interfaces, such that the electrowetting has a built-in memory effect.

The electrode 12 may consist of any suitable electrically conductive material formed from polymers such as PEDOT: PSS, metals such as Al, or semiconductors such as Si. The insulator 14 may be formed from any suitable electrically insulative material, such fluoropolymers like Fluoropel (Cytonix Corp.) or polymers such as Parylene (Cookson Inc.), or a conventional hydrocarbon or silicone polymer. Silicone and similar polymers may exhibit self-healing surface behavior. It is well known by those skilled in the art of textiles and silicones that self-healing behavior provides for a textile that has improved chemical, electrical, and physical robustness.

The insulator 14 need not be strongly hydrophobic; rather, a criterion for the insulator 14 is that it exhibits sufficient protection against electrical breakdown. The insulator 14 may also be internally comprised of one or more solid layers of one or more inorganic or organic dielectric materials such as $BaTiO_3$. Alternatively, the insulator 14 may be comprised of dispersed or fused particles of similar materials. These solid layers or particles may be surface coated, treated, permeated, or mixed with other materials to achieve the desired surface and bulk properties. The insulator 14 generally has a thickness ranging from an atomic monolayer to approximately ~100 µm. The insulator 14 may have a smooth, rough, patterned, or other form of surface texture.

Patterned or textured surfaces 15 are well known by those skilled in the art of surface treatments to provide improved hydrophobicity or resistance against surface contamination. If the textile 10 itself is sufficiently smaller than the contacting liquid 16, it may itself exhibit similar behavior to that of a textured or patterned surface 15. The underlying effect of patterning or texturing is that surface contact area to the liquid 16 is decreased and hydrophobicity increased according to the well-known Cassie-Baxter relation. The insulator 14 may contain charge trapping effects and materials. An exemplary embodiment is to disperse dielectric nanopowders, such as $TiO_2$, in a hydrophobic fluoropolymer. Various approaches for providing charge trapping are well known by those skilled in the art of inorganic and organic electronic materials.

Figure 1C:
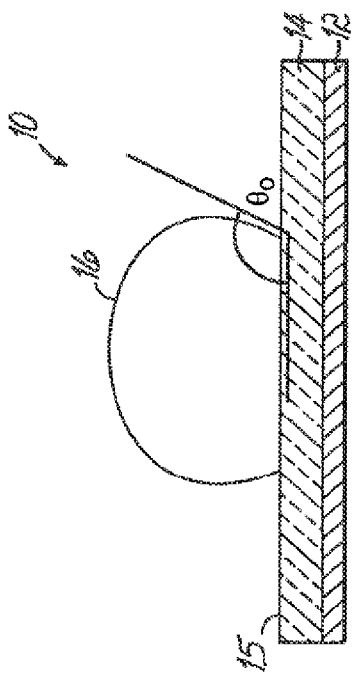
Figure 1D:
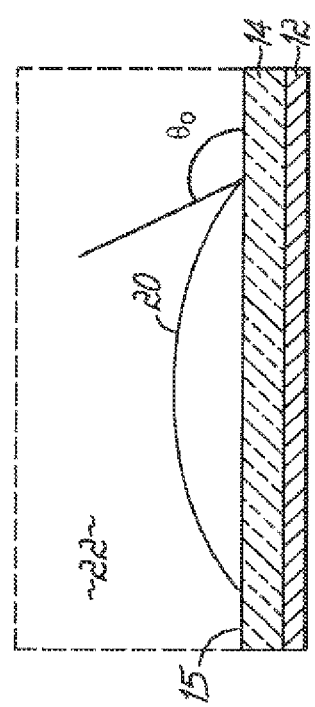

As shown in FIG. 1C, a volume of a non-polar liquid 20, such as an oil, may also be manipulated via electrowetting. Here, electrowetting of a volume of a polar liquid 22 causes the non-polar liquid 20 to dewet the surface of the insulator 14, as shown in FIG. 1D. Based on interfacial surface tensions between the non-polar and polar liquids 20, 22, the non-polar liquid 20 may situate itself as a continuous film between the liquid 22 and insulator 14, or as a single or multiple volumes of non-polar liquid 20 partially covering the insulator surface 15. Upon applying voltage, the non-polar liquid 20 may be broken up into smaller volumes, repelled to non-electrowetting areas, or even dewetted from the insulator surface 15 completely. The non-polar liquid 20 may be any liquid that is sufficiently immiscible with the primary electrowetting liquid 22. Examples include alkanes, silicones, and various other fluids and the term 'oil' is used for convenience and not as limiting the scope of non-polar liquids to conventional 'oils'. The non-polar liquid 20 may even partially mix with the polar liquid 22. Alternative embodiments of the invention also allow the non-polar liquid 20 to partially or fully replace the location or function of the insulator 14. Alternatively, a fluid such as air or gas may replace and behave similarly to the non-polar liquid of FIGS. 1C, 1D.

The non-polar liquid 20 or polar liquid 22, or adjacent layers or materials may contain colorants in the form of pigments or dyes. This allows a visible change in optical appearance of the device 10 as electrowetting is modulated. The non-polar liquid 20 or polar liquid 22, or adjacent materials or layers, may exhibit other optical properties as well such a diffractive, refractive, and reflective.

The fluids or liquids of FIGS. 1A-D may be manipulated in an electrofluidic system consisting of one or more electrodes; one or more electrical insulators; and one or more voltage or charge sources.

Typical applied direct current (DC) voltages for a high-capacitance insulator 14 are in the range of 5 V to 25 V but are not so limited because a variety of insulating materials may be utilized. Alternating current (AC) voltage may also be used and, in some instances, may improve electrical reliability and maximum wetting effect.

In an electrofluidic system of the invention, liquids can be wicked, repelled, moved, held, absorbed, dried, wetted, dispensed, or otherwise manipulated. Such liquid manipulation will be further understood as various embodiments of the invention are discussed.

Figure 2C:
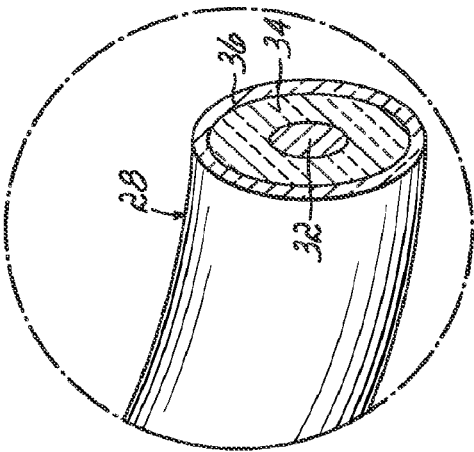
FIG. 2C is an enlarged view in partial cross-section of one of the fibers shown in FIG. 2B.
Figure 2B:
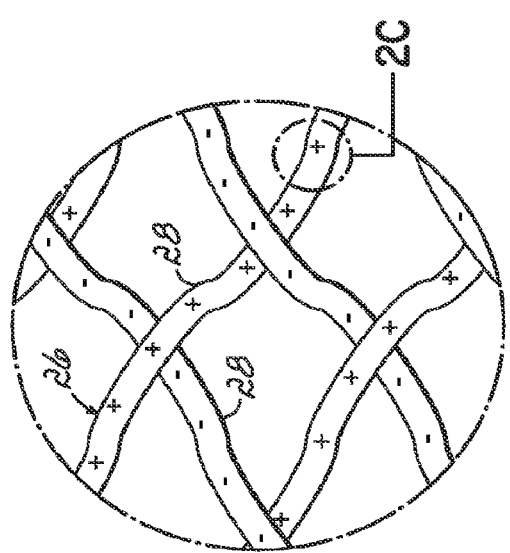
FIG. 2B is an enlarged view of a portion of FIG. 2A.
Figure 2A:
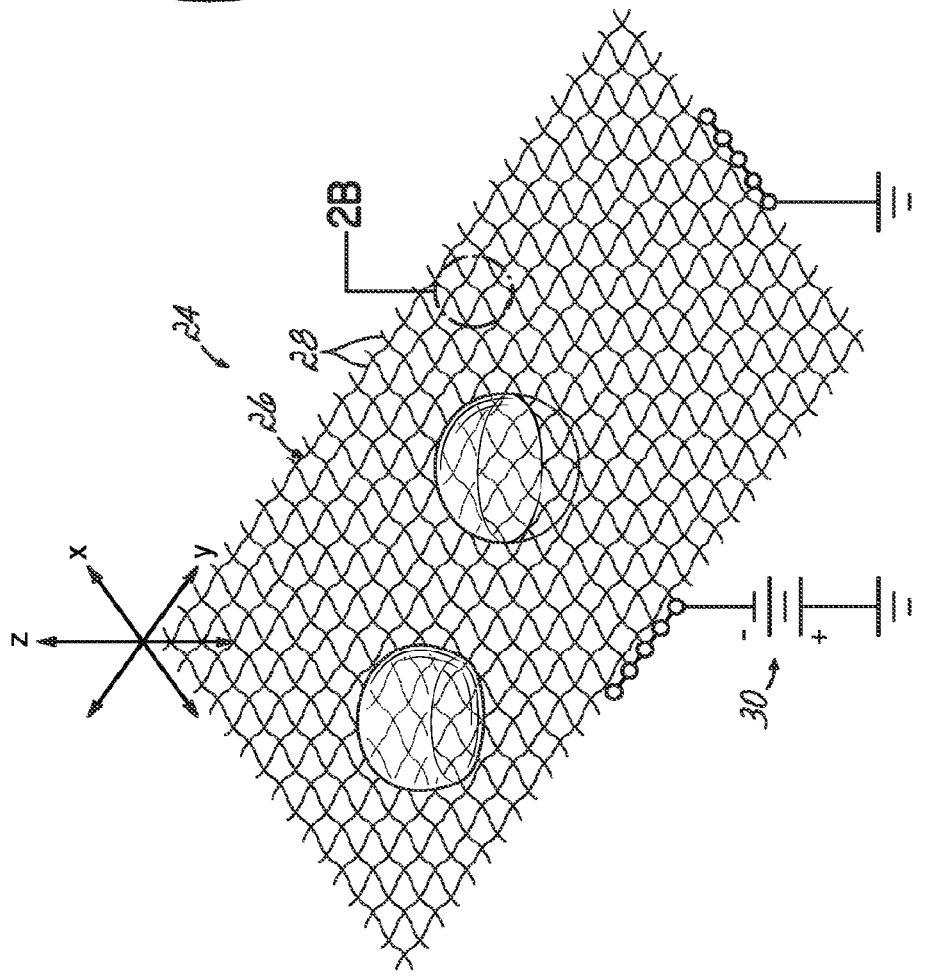
FIG. 2A is an isometric view of an electrofluidic textile in accordance with an embodiment of the invention.

As shown in FIGS. 2A-C and in accordance with an embodiment of the invention, an electrofluidic system in textile form, or an electrofluidic textile (EFT) 24, is capable of liquid manipulation. The EFT 24 consists of a woven porous web or fabric 26 of individual electrowetting elements or fibers 28 connected to one or more voltage sources 30. As best shown in FIG. 2B, charge is supplied to alternative fibers 28 in the fabric 26. This causes the liquid to further wet the EFT 24 by decreasing liquid height in the z direction and promoting liquid spreading in the x-y directions. As best shown in FIG. 2C, each fiber 28 may be made from an electrical conductive core 32, a sheath or layer 34 of an electrically resistive or insulating material surrounding the core 32, and an optional surface coating 36. Alternatively, the core 32 may comprise a tubular electrical conductor coating an insulating inner member. Dual core or dual fiber (woven or adjacent) configurations are also possible to improve strength and conductivity.

As best shown in FIG. 2B, different groups of the individual fibers 28 may be supplied with different voltages from voltage source 30 to establish a potential difference. As illustrated, one group of fibers 28 is electrically coupled with one voltage terminal of voltage source 30 (e.g., the positive voltage terminal) and another group of fibers 28, which are woven with and extend orthogonally to the first group, is electrically coupled with another voltage terminal of the voltage source 30 (e.g., the negative voltage terminal). The negative voltage terminal may be grounded so that the latter group of fibers 28 is uncharged (i.e., at a nil voltage). Because the woven fibers 28 represent an x-y electrode array constituting the fabric 26, the one or more switchable voltage sources 30 electrically connected to one or more fibers 28 can then move liquid in any x-y direction at speeds up to about 10 cm/s. Therefore, the EFT 24 is capable of robust liquid wicking and liquid movement/pumping. In an alternative embodiment of the invention, electrodes (not shown) may be patterned onto the assembled fibers 28 and an electrical insulator (not shown) added. The electrowetting may be laterally or spatially varied with voltages or charges applied from one or more voltage sources 30.

Figure 3A:
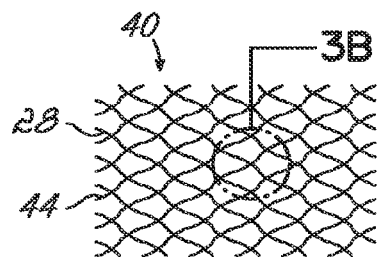
FIG. 3A is an isometric view of an electrofluidic textile in accordance with an embodiment of the invention.
Figure 3B:
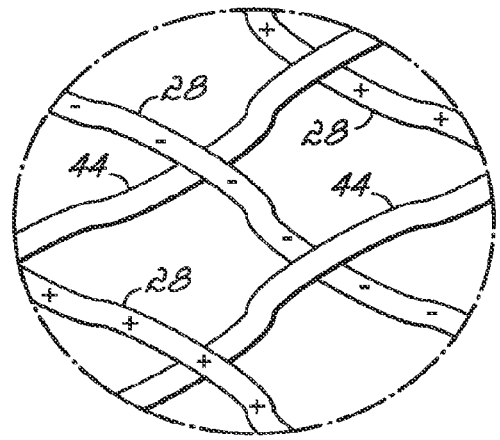
FIG. 3B is an enlarged view of a portion of FIG. 3A.

With reference to FIGS. 3A, 3B and in accordance with an embodiment of the invention, an electrofluidic system in textile form, or an electrofluidic textile (EFT) 40, of the invention is capable of liquid manipulation. The EFT 40 is capable of wicking (z direction) similar to EFT 24 (FIGS. 2A-C). However, the EFT 40 is capable of only one-dimensional lateral (x or y) movement of liquid. The EFT 40 is advantaged in that it integrates conventional textile material fibers 44 and reduces the likelihood of electrical shorts between adjacent EFT fibers 28. Furthermore, by commingling conventional non-electrofluidic textile fibers 44 with EFT fibers 28, the wicking range of the EFT 40 may be shifted to be more hydrophobic or hydrophilic. As illustrated, a first group of fibers 28 is electrically coupled with one voltage terminal of voltage source 30 (e.g., the positive voltage terminal). A second group of fibers 28, which are woven with the first group, is electrically coupled with another voltage terminal of the voltage source 30 (e.g., the negative voltage terminal).

The woven EFT 24 (FIG. 2) and EFT 40 (FIG. 3) represent two embodiments of woven electrofluidic textiles, but do not constitute and exhaustive set of examples. Other textile formats containing EFT fibers and conventional fibers are appreciated by those skilled in the arts of electrowetting or textiles. For example, the electrofluidic textiles of the various embodiments of the invention may be partially or fully non-woven in form. As one example, the EFT may comprise a non-woven textile, such as holes punched or laser-cut into a plastic film.

Figure 4A:
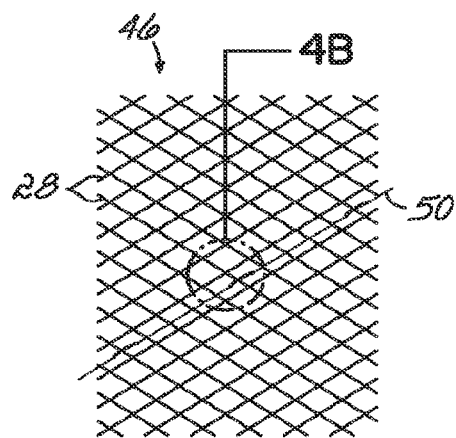
FIG. 4A is an isometric view of an electrofluidic textile in accordance with an embodiment of the invention.
Figure 4B:
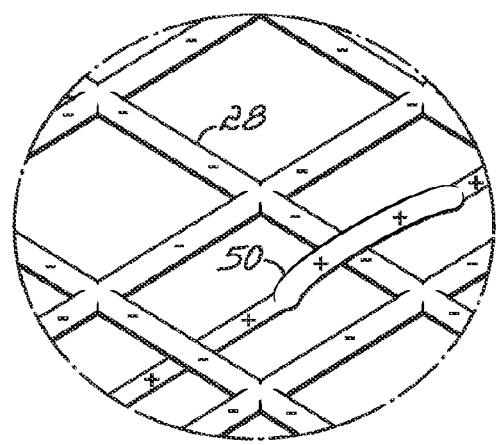
FIG. 4B is an enlarged view of a portion of FIG. 4A.

With reference to FIGS. 4A and 4B and in accordance with an embodiment of the invention, an EFT 46 comprises a non-woven web or textile of electrofluidic fibers 28 with a cross-section shown in FIG. 2C. In order to supply counter voltage to the EFT 46, electrode fibers 50 are attached or woven into the web of non-woven fibers 28 such that the electrode fibers 50 are commingled with the electrofluidic fibers 28. Each of the electrode fibers 50 comprises a thread or strand of an electrically conductive material. Each of the electrode fibers 50 is electrically coupled with one voltage terminal of the voltage source 30 (FIG. 2A), such as the positive voltage terminal. Each of the electrofluidic fibers 28 is electrically coupled with another voltage terminal of the voltage source 30, such as the negative voltage terminal.

Figure 4C:
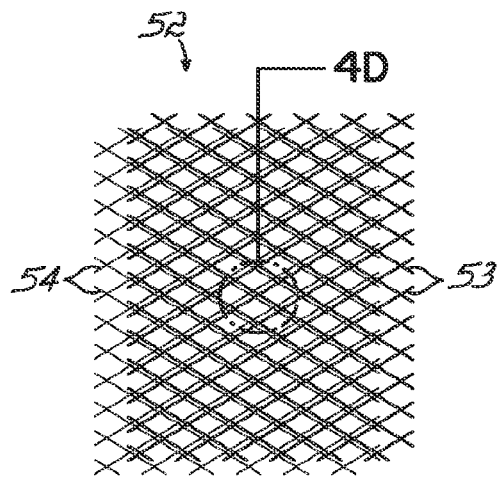
FIG. 4C is an isometric view of an electrofluidic textile in accordance with an embodiment of the invention.
Figure 4D:
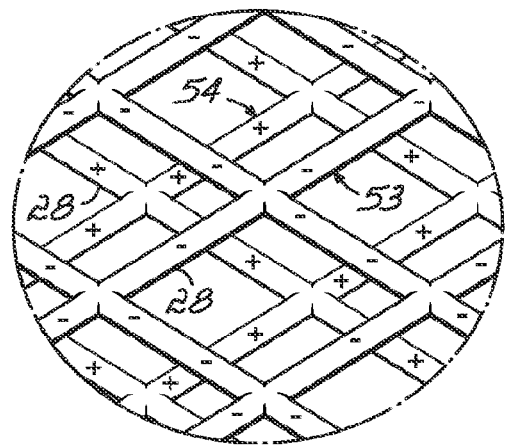
FIG. 4D is an enlarged view of a portion of FIG. 4C.

With reference to FIGS. 4C and 4D, the fibers of an EFT 52 are separated into a first layer 53 and a second layer 54 stacked or juxtaposed with the first layer to comprise two distinct non-woven textiles arranged for supplying counter voltage. The fibers 28 in the first layer 53 and the fibers 28 in the second layer 54 may be coupled in parallel with the voltage source 30 (FIG. 2A) so that each of the layers 53, 54 is adapted to be independently biased for transferring the fluid between the first and second layers 53, 54. As illustrated, the fibers 28 in layer 53 are electrically coupled with one voltage terminal of voltage source 30 (e.g., the negative voltage terminal) and the fibers 28 in layer 54 are electrically coupled with another voltage terminal of the voltage source 30 (e.g., the positive voltage terminal).

Figure 4E:
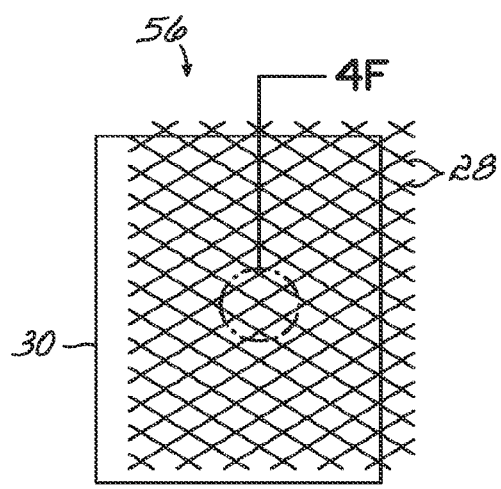
FIG. 4E is an isometric view of an electrofluidic textile in accordance with an embodiment of the invention.
Figure 4F:
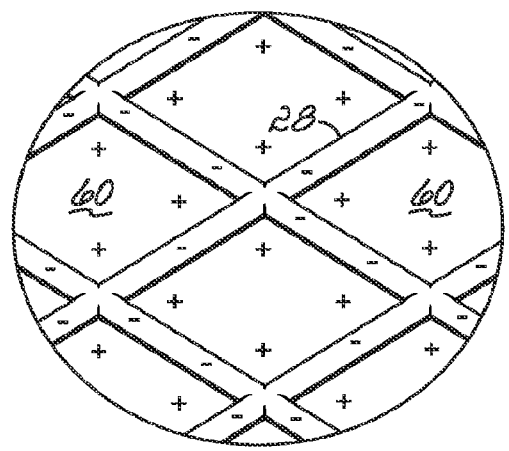
FIG. 4F is an enlarged view of a portion of FIG. 4E.

With reference to FIGS. 4E and 4F, the fibers 28 of an EFT 56 are arranged in a porous web and associated with an electrofluidic film 60. Film 60 includes an insulator film and a conductor film laminated with the insulator film, similar to the layered arrangement shown in FIGS. 1A-D. The electrofluidic film 60 is juxtaposed with the layer of fibers 28 in the porous web. The conductive core 32 of the electrofluidic fibers 28 is electrically coupled with a first voltage terminal of the voltage source 30 (FIG. 2A). The electrofluidic film 60 is electrically coupled with a second voltage terminal of the voltage source 30.

Various embodiments of FIGS. 4A-E are possible that include two electrodes and at least one electrical insulator. The electrodes and insulators are placed within adequate proximity such that electrowetting of the insulator(s) may be induced upon application of voltage from a voltage source to the electrodes.

With reference to FIGS. 5A and 5B and in accordance with an embodiment of the invention, an electrofluidic textile of an embodiment of the invention may comprise an EFT reservoir 64 having the form of a sponge or other porous material. The EFT reservoir 64 is capable of liquid manipulation similar to that described for FIGS. 1-4, but utilizes wetting of internal capillary spaces or voids rather than wetting of fiber surface area. As shown in FIG. 5B, EFT reservoir 64 includes a porous and electrically conductive material 66 with voids 68 and an insulator layer 70 coated the material 66 bordering each void 68. The material 66 may be conductive or coated with a conductor such that it may be made conductive before insulator coating. Upon application of voltage to the EFT reservoir 64, liquid is pulled into the reservoir 64 and held in the voids 68. Conversely, upon reduction of voltage, liquid may be held or may be expelled from the voids 68 of the EFT reservoir 64. Alternatively, numerous stacked EFT textiles of FIGS. 1-4 may also collectively constitute an EFT reservoir similar to EFT reservoir 64. The voltage source 18 is electrically coupled with the electrically conductive material 66 for biasing the electrically conductive material 66 to modify the fluid or liquid capacity of the voids 68.

With reference to FIGS. 5C and 5D and in accordance with an embodiment of the invention, an EFT reservoir 72 constituting an electrofluidic textile may be comprised of one or more large voids constituting a reservoir 74 and an electrofluidic valve element 76. The electrofluidic valve element 76 controls liquid flow in and out of the reservoir 74 and is further capable of actively pumping liquid, as described elsewhere herein. The electrofluidic valve element 76 is constructed from electrofluidic fibers 28 arranged to define a porous web. The electrofluidic valve element 76, when electrically biased, selectively admits fluid from an environment 78 outside of the reservoir 74 to the reservoir 74.

Numerous fluidic capabilities for electrofluidic textiles are possible within the spirit of the invention.

Figure 6A:
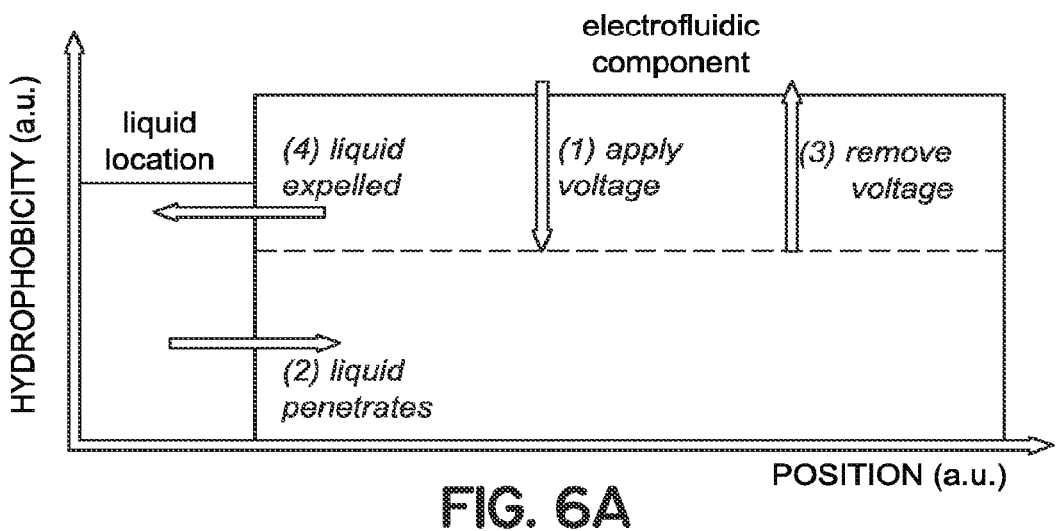
FIGS. 6A-C are diagrammatic views illustrating the wettability of an electrofluidic textile in accordance with embodiments of the invention.
Figure 6B:
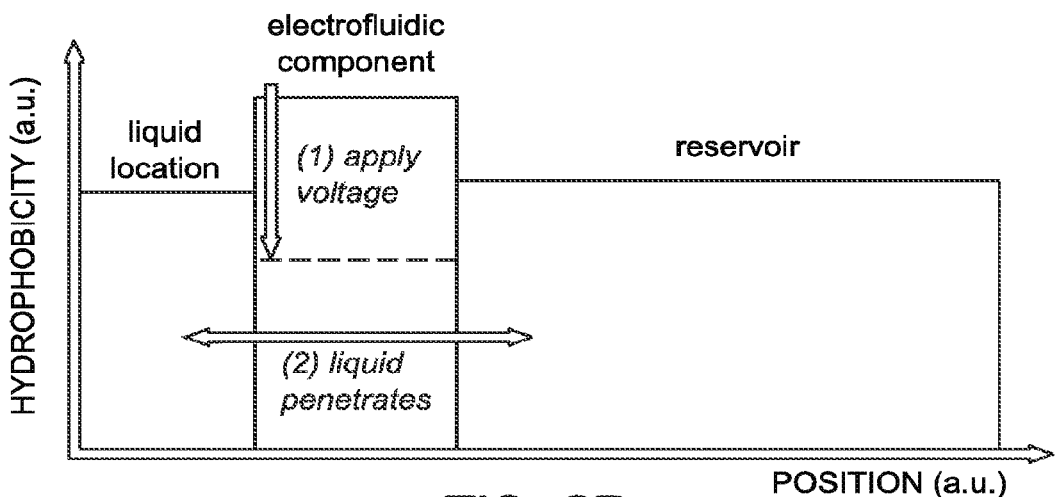
Figure 6C:
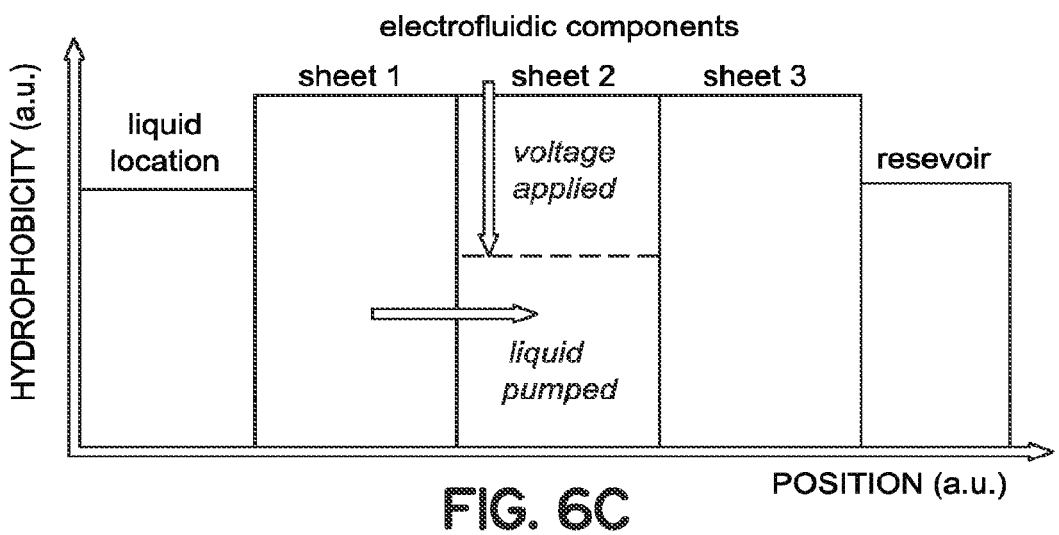

With reference to FIGS. 6A-C and in accordance with embodiments of the invention, the basic EFT capability is readily extendable to textile, absorbent, and fluidic applications known by those skilled in the art of textiles and fluidics. FIGS. 6A-C represent diagrams of hydrophobicity (liquid repulsion strength in arbitrary units) as a function of position (physical distance in arbitrary units).

With specific reference to FIG. 6A, an electrofluidic component is placed adjacent to a liquid location. With no voltage applied to the system, the electrofluidic component is liquid repelling such that liquid remains in liquid location. Upon application of voltage to the system, the hydrophobicity of the electrofluidic system decreases, as indicated by the dotted line. This then allows the liquid to leave the liquid location and penetrate the electrofluidic component. As further shown in FIG. 6A, this process is reversible upon removal of the voltage.

With specific reference to FIG. 6B, an electrofluidic component can also be switched in hydrophobicity such that liquid may penetrate the electrofluidic component. This then allows liquid to travel in a direction between the reservoir and liquid location. Various pressure gradients, solution gradients, gravity, hydrophobicity, or other common liquid driving forces can enact liquid flow through the electrofluidic component. The liquid-repulsion force of the electrofluidic component may be optimized with such alternative forces to decrease the required operating voltage of the electrofluidic component.

With reference to FIG. 6C, multiple electrofluidic components (e.g., sheets), each with at least one voltage source, may be used to pump liquid from a liquid location to a reservoir without need for external liquid driving forces. At a first reference time (e.g., 0 ms), sheets 1-3 are unbiased. At a second reference time (e.g., 10 ms), a voltage (e.g., 5V) is applied to sheet 1 only, which moves liquid from the liquid location to sheet 1. At a third reference time (e.g., 20 ms), a voltage (e.g., 5V) is applied to sheet 2 only, which moves liquid from sheet 1 to sheet 2 as shown in FIG. 6C. At a fourth reference time (e.g., 30 ms), a voltage (e.g., 5V) is applied to sheet 3 only, which moves liquid from the liquid location to sheet 3. At a firth reference time (e.g., 40 ms), the sheets 1-3 are returned to an unbiased state, which moves liquid from sheet 3 to the reservoir.

Alternative embodiments of FIGS. 6A-C allow various intermediate states of hydrophobicity allowing liquid to occupy more physical space than only the least hydrophobic location.

Figure 7A:
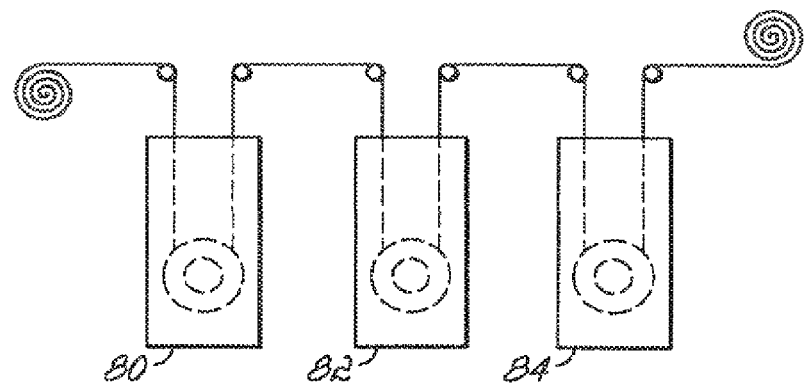
FIGS. 7A and 7B are diagrammatic views of systems for fabricating electrofluidic textiles of the embodiments of the invention.
Figure 7B:
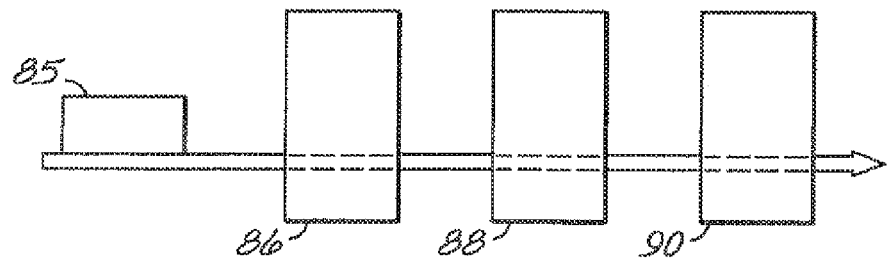

With reference to FIGS. 7A and 7B and in accordance with embodiments of the invention, the electrofluidic textiles of the invention may be fabricated using low-cost techniques. EFTs may be fabricated in fiber form then woven or fused together or fabricated from pre-woven materials. EFTs may be fabricated in non-woven forms including films or sheets. Roll-to-roll or batch processing techniques using sequential coating steps are preferred. EFTs may be fabricated through dipping or spraying with liquid that is then dried and leaves behind a desired residue or film. Alternatively, EFTs may be fabricated using chemical or vapor techniques such as those used for Parylene coatings.

As shown diagrammatically in FIG. 7A, vapor or liquid phase deposition may also be used to apply molecular monolayers, bilayers, or various layer sequences in a series of deposition systems 80, 82, 84 that apply an optional conductor coating, an insulator coating, and an optional surface coating, respectively. Intermediate monolayers or films may be implemented to modify adhesion, chemical resistance, functionality, or general robustness of adjacent films. Highly attractive are electro-chemical coatings that auto-conform to electrically conductive surfaces and self-terminate once adequate electrical conductivity or insulation is achieved.

As shown diagrammatically in FIG. 7B, EFT reservoirs or other porous materials may also be fabricated by processes other than vapor or liquid phase deposition. For example, a member 85 consisting of a porous base material may be processed by a series of systems 86, 88, 90 that apply an optional conductor coating, an insulator coating, and an optional surface coating, respectively. One example of porous EFT fabrication is to place a standard sponge in an aqueous solution of water:PEDOT:PSS, remove, dry excess water, dip in an insulator solution, dry, and then attach a voltage source.

Figure 8A:
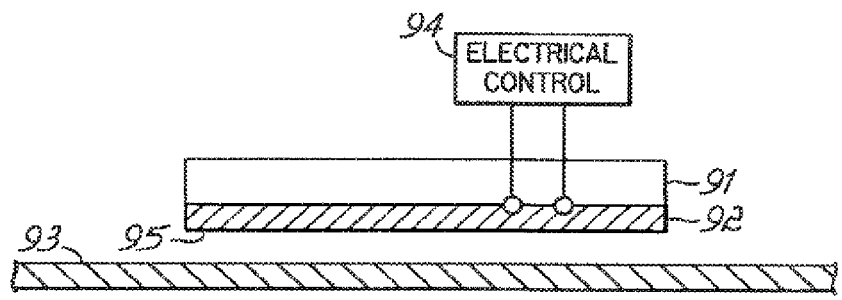
FIGS. 8A and 8B are diagrammatic cross-sectional views of electrofluidic textile cleaning devices in accordance with embodiments of the invention.
Figure 8B:
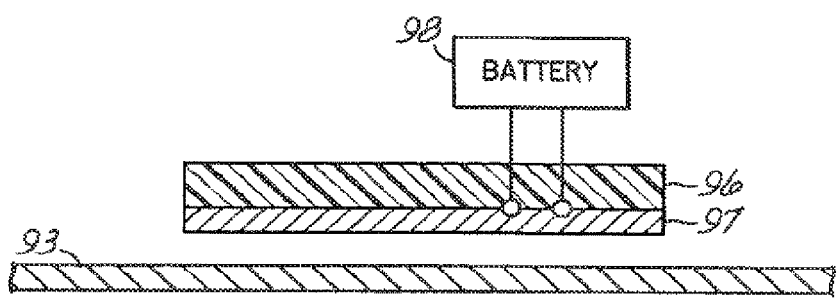

With reference to FIGS. 8A and 8B and in accordance with an embodiment of the invention, the electrofluidic textiles of the invention may form the basis for a cleaning device which absorbs and/or provides liquids from/to a surface. With specific reference to FIG. 8A, a reservoir 91 and electrofluidic component 92 are capable of dispensing a liquid contained in the reservoir 91 onto an object 93. The amount of liquid to be dispensed from reservoir 91 is modulated by an electrical control 94 coupled with the electrofluidic component 92. The electrofluidic component 92 is capable of providing efficient and uniform liquid dosing of the object 93 to be cleaned by creating a thin layer of liquid at a surface 95 of the electrofluidic component 92. The reservoir 91 acts a storage unit for liquid that is dispensed by the electrofluidic component 92. If the assembly of FIG. 8A is used as a cleaning device, the liquid in reservoir 91 may be water mixed with a cleaning agent. Many cleaning agents (such as bleach) cause strong fumes, thus leading to at least one of the advantages of the efficient liquid dosing by the assembly of FIG. 8A.

In an alternative embodiment and with reference to FIG. 8B, an absorber 96 and electrofluidic component 97 are capable of drying the object 93 through electrofluidic wicking. The absorber 96 receives liquid that the electrofluidic component 97 wicks from the object 93 to be dried. The electrofluidic component 97 may be powered by a battery 98.

The functionality provided by both devices of FIGS. 8A, 8B may be conveniently integrated into a single cleaning device. Furthermore, because surface energy and charge are easily modulated for the electrofluidic component 92 or 97, a cleaning device such as a mop may be created that operates well in both dry-mop and wet-mop mode. Switching between modes, or intermediate modes, may be determined by the user operating the electrical control 94.

EFTs of the invention may form the basis for a personal care device, as described hereinbelow.

Figure 9A:
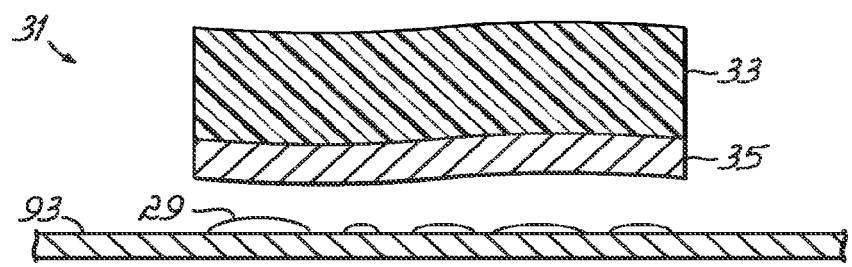
FIG. 9A is a diagrammatic cross-sectional view of a prior art personal care device.

With reference to FIG. 9A, a conventional personal care device 31 includes an absorbent 33 and a conventional wicking layer 35. Because the conventional wicking layer 35 is always capable of removing liquid 29 from the object 93, it is also always moist to the touch when liquid or moisture is present in the absorbent 33.

Figure 9B:
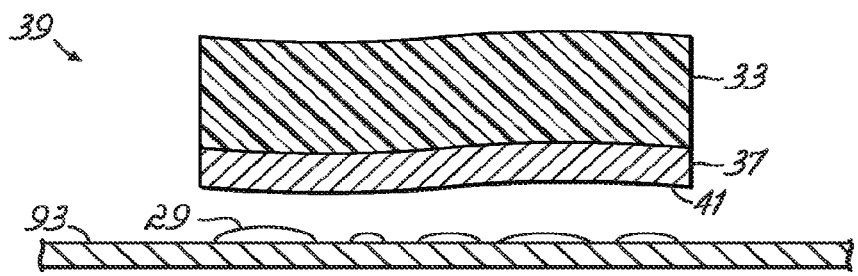
FIGS. 9B-D are diagrammatic cross-sectional views of an electrofluidic textile personal care device in accordance with an embodiment of the invention.
Figure 9C:
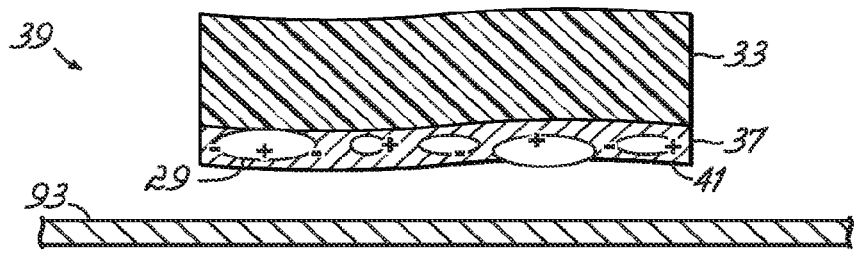
Figure 9D:
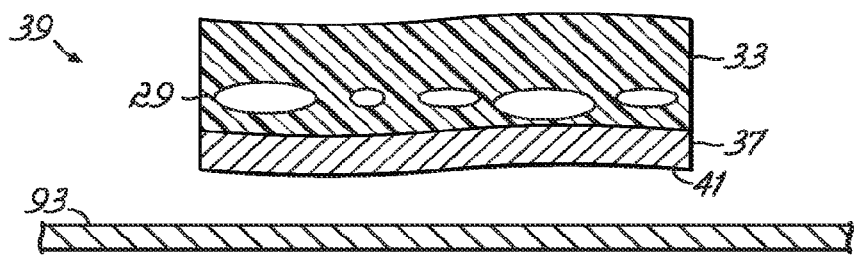

With reference to FIGS. 9B-D, a personal care device of an embodiment of the invention is capable of overcoming this limitation of conventional personal care devices 31 (FIG. 9A) by replacing the conventional wicking layer 35 with a electrofluidic wicking component 37. As described herein, the EFT personal care device 39 is capable of removing a polar liquid from an object while also maintaining a surface 41 that is dry to the touch after the liquid 29 has been transferred to the absorber 33. In an alternative embodiment, a polar liquid 29 may be moved laterally from one area of the object 93 to another. As an example, the EFT personal care device 39 may be used to remove moisture from the surface of the skin.

Figure 10A:
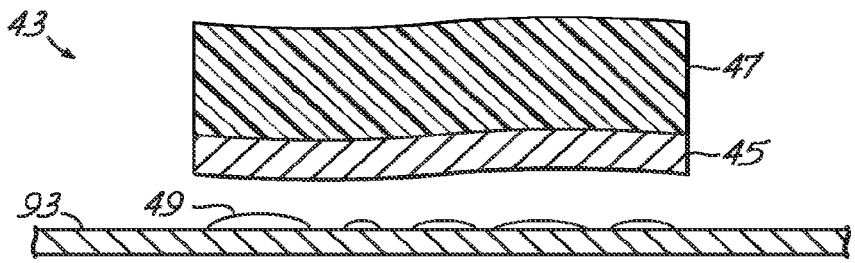
FIG. 10A is a diagrammatic cross-sectional views of a prior art degreasing wipe.

With reference to FIG. 10A, a conventional degreasing wipe includes an absorbent 47 and a conventional wicking layer 45. Because the conventional wicking layer 45 is always capable of removing a non-polar liquid 49, such as oil, from the object 93, it is also always moist to the touch when liquid or moisture is present in the absorbent 47.

Figure 10B:
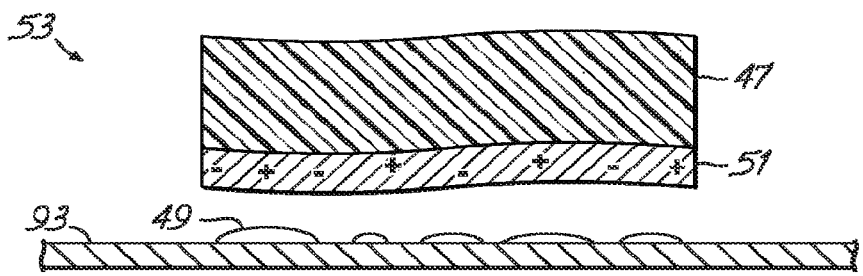
FIGS. 10B-D are diagrammatic cross-sectional views of an electrofluidic textile degreasing wipe that does not require harsh alcohol or detergent in accordance with an embodiment of the invention.
Figure 10C:
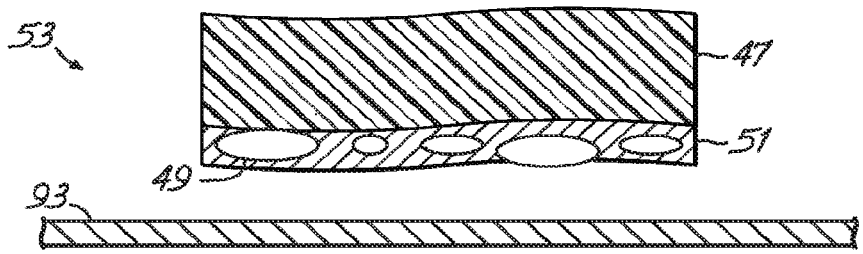
Figure 10D:
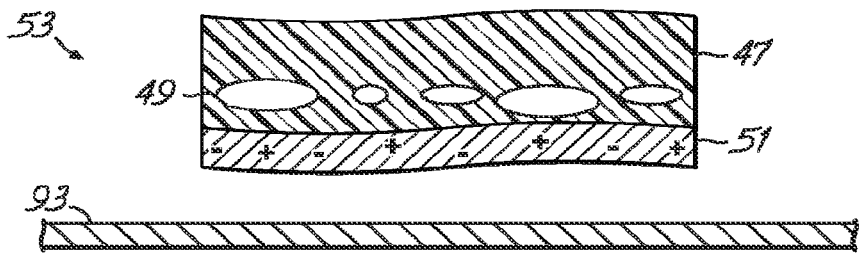

With reference to FIGS. 10B-D and in accordance with an embodiment of the invention, an electrofluidic component 51 may be used to manipulate the non-polar liquid 49 on object 93. The EFT device 53 is able to wick the non-polar liquid 49 from the object 93 using purely electrofluidic means. The non-polar liquid 49 is removed from the surface of the electrofluidic component 41, which creates a dry-touch surface. The principles of moving a non-polar liquid 49, such as oil, via electrowetting are described herein. These principles require that water or another polar liquid (not shown) be supplied to the electrofluidic component 51 so that the polar liquid may manipulate motion of the non-polar liquid 49.

In an alternative embodiment of the invention, the EFT device 31 (FIGS. 9B-D) and EFT device 53 of (FIGS. 10B-D) may be used to dose and/or remove polar or non-polar liquids as described for the cleaning device of FIGS. 8A, 8B. This allows the EFT device 53 of FIGS. 10B-D to be utilized as distributing devices for personal care products, such as moisturizer pads.

With reference to FIGS. 11A-C and in accordance with an alternative embodiment of the invention, a filtration device 55 includes the EFT 24 consisting of a woven fabric 26 of individual electrowetting elements or fibers 28 (FIG. 2C). It is well known by those skilled in the art of filters that filtering capability may be made selective by providing charge or specific surface energy to a filtering medium, and/or by providing charge or specific surface energy to a medium to be filtered. The EFT 24 is capable of switchably filtering by modulating surface energy, charge, and wetting capability. Furthermore, the EFT 24 is capable of further removing filtered substances by electrowetting or charge flow principles.

As best shown in FIG. 11A, the woven EFT 24 is capable of filtering a liquid 57 flowing in the z direction, as generally indicated by single-headed arrow 59. As best shown in FIG. 11C, a filtered substance or species 61 is captured by the electrowetting fibers 28. This filtered species 61 is thereby removed from the flowing liquid 57. If further desired, the filtered species 61 may be removed from the filtration device 55 using electrofluidic principles. The filtration device 55 may be, for example, a self-cleaning or high-efficiency water filtration device or an absorbent device for the cleaning of oil spills at sea or other locations. The EFT filtration device 55 may clean oil in a manner similar to that achieved by hydrophobic sand. However, the EFT filtration device 55 supplies the added capabilities of oil pumping and reusability.

Figure 11D:
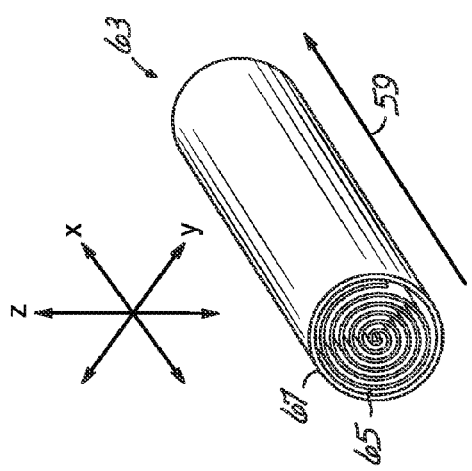
FIG. 11D is a diagrammatic end view of a self-cleaning electrofluidic textile filtration device in accordance with an embodiment of the invention.
Figure 11E:
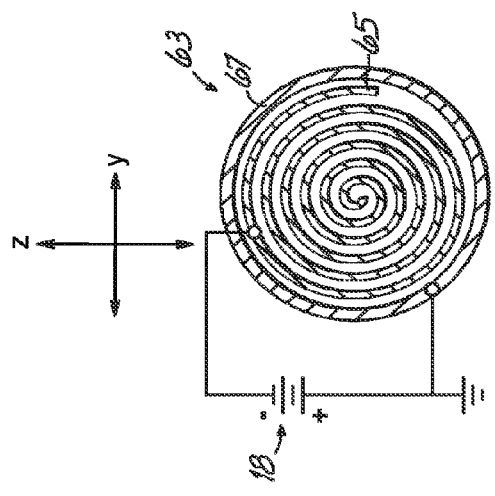
FIGS. 11E and 11F are diagrammatic cross-sectional views of the self-cleaning electrofluidic textile filtration device of FIG. 11D.
Figure 11F:
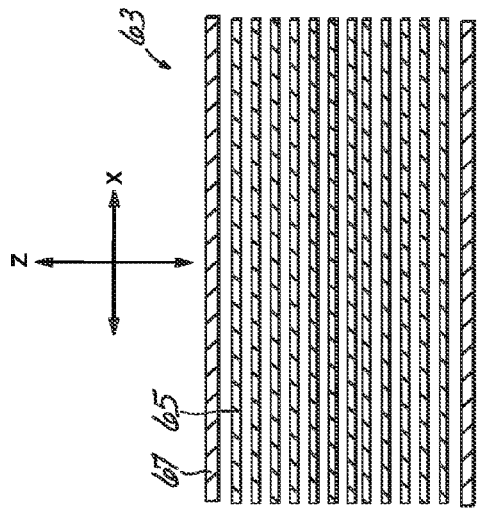

With reference to FIGS. 11D-F and in accordance with an alternative embodiment of the invention, an EFT filtration device 63 contains a rolled electrofluidic film or textile 65 that presents an increased EFT-capable surface area in a compact device package design. Multiple such arrangements for high-packing-density EFTs are readily understood by those skilled in the art of textiles, filters, and electronic capacitors. The EFT textile 65 is surrounded by a casing 67 and biased by voltage supply 18.

Figure 11G:
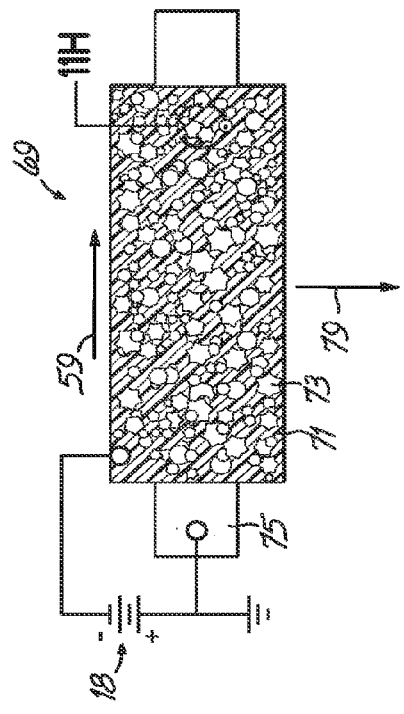
FIG. 11G is a diagrammatic view of a self-cleaning electrofluidic textile filtration device in accordance with an embodiment of the invention.
Figure 11H:
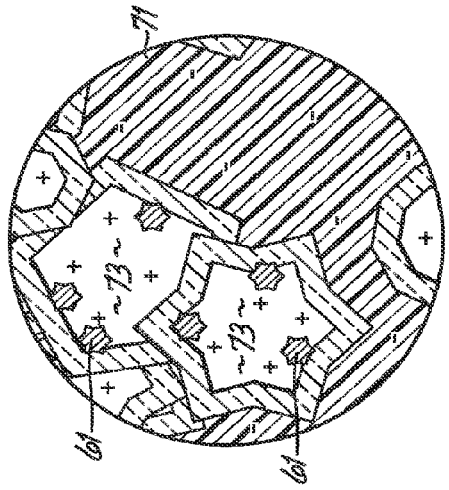
FIG. 11H is an enlarged view of a portion of FIG. 11G in which a filtered substance is visible.
Figure 12:
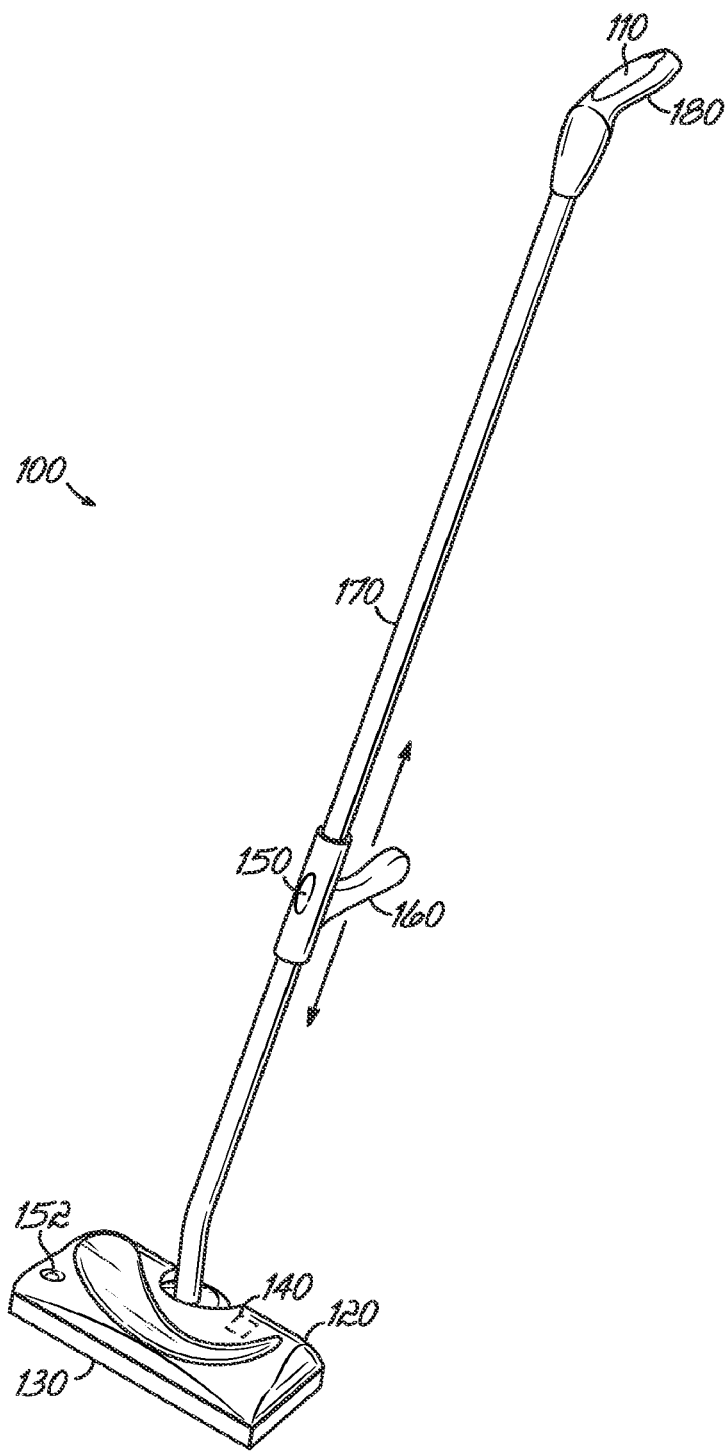
FIG. 12 is an isometric view of a cleaning device in accordance with an embodiment of the invention.
Figure 13A:
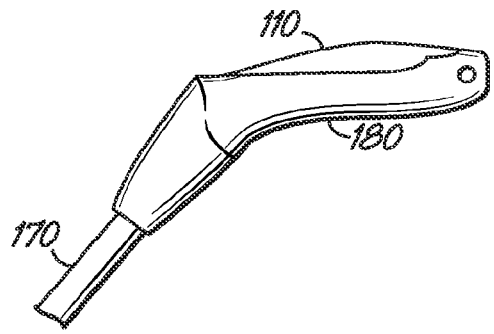
FIGS. 13A-C are perspective views of the portions of the cleaning device of FIG. 12.
Figure 13B:
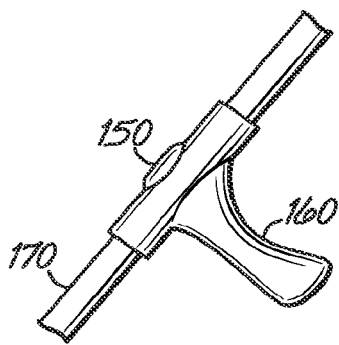
Figure 13C:
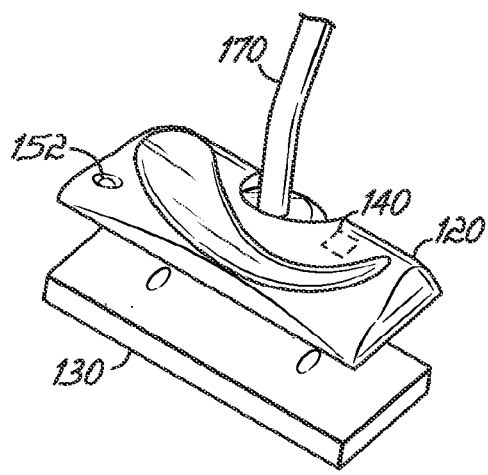
Figure 13D:
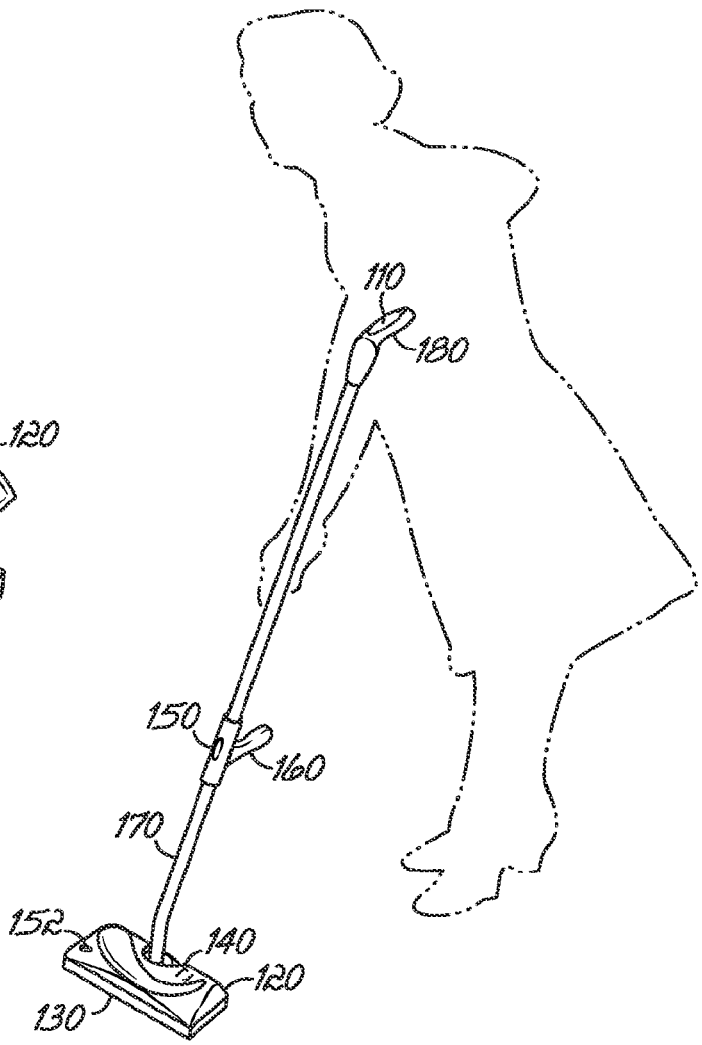
FIG. 13D is a perspective view of the cleaning device of FIG. 12 illustrating consumer use for cleaning a surface.

With reference to FIGS. 11G and 11H and in accordance with an alternative embodiment of the invention, an EFT filtration device 69 includes a storage material 71 that is porous, such as a sponge. The EFT filtration device 69 is also capable of high-surface-area EFT capability in a compact package.

Fluid or liquid from a liquid input 75 may penetrate into voids or spaces 73 inside the storage material 71 of the EFT filtration device 69 via electrowetting. Electrowetting into spaces 73 within the EFT filtration device 69 is strongly dependent on the local EFT geometry. For example, a diverging capillary geometry can reduce or prevent capillary pull whereas a converging capillary geometry can increase capillary pull. The invention includes optimizing such geometries to enhance, reduce, prevent, or cause wetting or electrowetting of the EFT filtration device 69 with or without application of voltage. The same modifications in capillary geometry are applicable to other embodiments of the present invention. The flow of filtered species 61 is indicated by a single headed arrow 79. Filtered liquid is transferred through the filtration device 60 to a liquid output 77. The EFT reservoir 64 (FIGS. 5A, 5B) may be used to construct the filtration device 69.

An exemplary alternative embodiment of the invention is an EFT characterized by a nearly neutral capillary force with the contacting liquid. Capillary neutral behavior is achieved through selecting EFT surface energy and geometry. A capillary neutral EFT requires a small voltage, or other external stimulus, to experience electrowetting within its volume. Such surface energy, geometry, and voltage control may be used to multiplex wetting of multiple liquids. For example, a hydrophobic EFT at zero voltage may be fully wetted by a non-polar liquid, such as oil, but yet experience little or no wetting by a polar liquid. Upon applying voltage to the system, the locations of these two liquids could partially or fully reverse. In an alternative embodiment of the invention, it could be considered that the EFT moves into the liquid. A non-limiting application of such an embodiment may include an EFT that is resting upon a body of liquid and acting as a flotation or a fluid barrier device and, upon applying electrowetting, the textile is able to move into the body of liquid. The EFT itself or liquids may also incorporate one or more surfactants such as sodium-dodecyl-sulfate. Surfactants may lower the operating voltage of the EFT, as predicted by electrowetting theory.

With reference to FIGS. 12 and 13A-D and in accordance with an embodiment of the invention, a cleaning implement or device 100 includes a cleaning pad 130, a handle 170, and a control unit 140. Cleaning pad 130 removably attaches to a cleaning head 120 of handle 170. Handle 170 may be designed so that an average-sized adult can comfortably grasp handle 170 and move handle 170 causing device 100 to clean any surface, such as a floor (not shown), or a wall (not shown). Alternatively, handle 170 may be the length of an average-sized adult's arm and bent for use to clean a toilet. The handle 170 may include a size-reduction mechanism that permits the operator to reduce the size of handle 170 or to fold the handle 170 for more compact storage.

Grips 180 and 160 are attached to handle 170. Grip 160 may be moved up and down along handle 170. However, grip 160 may be locked into place so that it will not move. Attached to grip 160 is a release mechanism 150 that operates to detach cleaning pad 130 from handle 170. The release mechanism 150 may be constructed to allow a quick release of cleaning pad 130. Alternatively, release mechanism 150 may be carried on cleaning head 120, such as hook and loop fasteners. The release mechanism 150 permits the operator to release the cleaning pad 130 from the cleaning head 120 for disposal without contacting the cleaning pad 130.

Grip 180 is fixed to the top of handle 170. Attached to grip 180 is sensor 110 that is electrically coupled with control unit 140. The sensor 110 may, for example, activate control unit 140 through capacitance. However, a switch or any other automatic sensor, such as a heat sensor, may also be used as sensor 110 to activate control unit 140. Control unit 140 controls any electrofluidic textiles in cleaning pad 130, as well as any other mechanical subsystem of the cleaning device 100. Control unit 140 is located inside cleaning head 120. However, the control unit 140 may also be located in handle 170.

Figure 17A:
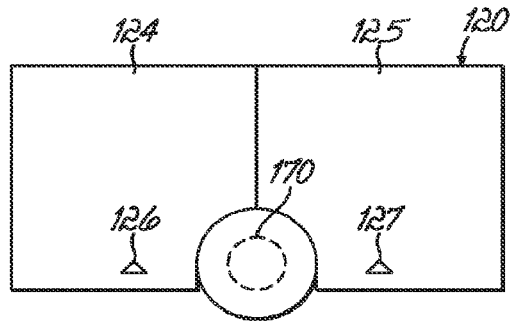
FIGS. 17A-E are diagrammatic top views of cleaning heads for use with the cleaning device of FIGS. 12 and 13A-D in accordance with various embodiments of the invention.

With reference to FIG. 17A, the cleaning head 120 may include a reservoir 124 for storing liquids that have been absorbed by cleaning pad 130 and a reservoir 125 for holding liquids that will be dispensed by device 100. Reservoirs 124, 125 have corresponding release valves 126, 127 that permit access to the contained liquids. Reservoirs 124, 125 may be formed from a transparent plastic, translucent plastic, opaque plastic, or a bladder material. The cleaning head 120 may include additional reservoirs (not shown) similar to reservoir 125 for holding additional fluids or liquids to be dispensed by device 100 and additional reservoirs (not shown) similar to reservoir 124 for storing fluid or liquid (not shown) absorbed by cleaning pad 130. Alternatively, the cleaning head 120 may not include any reservoirs. Different embodiments of the cleaning head are illustrated in FIGS. 17B-E.

Figure 14A:
FIGS. 14A-I are diagrammatic cross-sectional views of various alternative embodiments of removable cleaning pads for use with the cleaning device of FIGS. 12 and 13A-D.
Figure 14B:
Figure 14C:
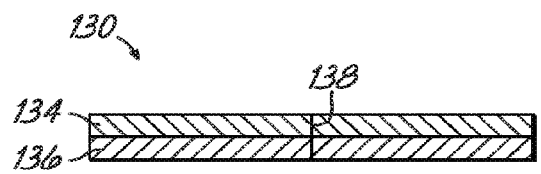

With reference to FIG. 14C, the cleaning pad 130 may include a layer 134 of an absorbent and a layer 136 that comprises an electrofluidic textile, as described herein. Cleaning pad 130 may be constructed so as to both dispense and absorb liquids (not shown). In particular, electrofluidic textile layer 136 and absorbent layer 134 may be divided by a partition 138 into one portion for absorbing liquids and another portion for dispensing liquids. This allows reservoir 124 to release liquid into a partition of cleaning pad 130, while the other partition of cleaning pad 130 is simultaneously forcing liquid into reservoir 125. Alternatively, the absorbing portion of cleaning pad 130 may be sequentially turned on after the dispensing partition of cleaning pad 130 has ended. The partition 138 separating the individual reservoirs 124, 125 may be the walls of the individual reservoirs 124, 125, if the reservoirs 124, 125 are juxtaposed, or portions of the cleaning pad 130 if the reservoirs 124, 125 are spaced apart.

Absorbent 134 may comprise any material capable of absorbing and retaining fluid during use, such as nonwoven fibrous material formed from natural or synthetic fibers. Absorbent 134 may be pretreated with a number of chemicals that aid in cleaning, including extra surfactants, enzymes, perfumes, and other chemicals known to a person skilled in the relevant art.

In use, device 100 is utilized to clean a surface. To that end, device 100 is powered by operator interaction with sensor 130 and control unit 140 initiates the wetting process of cleaning pad 130 by electrowetting principles. Alternatively, the wetting process may be initiated using other microfluidic methods known to one skilled in the art. The consumer may be informed that device 100 is powered and operating by a visual indicator or, alternatively, by audible or tactile feedback. The dispensing portion of cleaning pad 130 is wetted from reservoir 124. When an operator puts cleaning pad 130 into contact of a surface, the liquid is released from the dispensing portion of the cleaning pad 130 onto the surface. The absorbing portion of cleaning pad 130 actively absorbs the cleaning liquid from the surface and fills reservoir 126. When the cleaning pad 130 is spent, the operator may manipulate the release mechanism 150 to release the spent cleaning pad 130 from the cleaning head 120 for disposal.

Cleaning pad 130 may change colors, from white or colorless to a pre-determined color, once contact is made with any liquid. The color change may be incremental with the load of liquid. When the coloration vanishes, the cleaning pad 130 may be replaced.

Cleaning pad 130 and/or the cleaning fluid may also be colored depending on what surface or mess is desired to be cleaned. In one embodiment, the cleaning pad 130 may be colored orange for wood, blue for windows, yellow for the kitchen and bathroom, and purple for pet messes. Cleaning pad 130 may change colors only when the power is switched on. When power is removed, the cleaning pad 130 may return to its original white color. The color change may be caused by liquid coming in contact with cleaning pad 130. Alternatively, special-purpose textiles may be added to the pad to supply the color change or appropriate dyes may be added to the fluid or to the cleaning pad 130.

In an alternative embodiment, the cleaning head 120 may include a light emitting diode (LED) 152, or other light emitter, electrically coupled with the control unit 140. Control unit 140 activates the LED 152 when the power is activated. The LED 152 may flash when reservoirs 124, 125 are either almost filled or almost emptied, respectively, of liquid.

With reference to FIGS. 14A-14I, the removable cleaning pad may have various different configurations or combinations of electrofluidic textile layers, absorbent layers, and reservoir layers. The reservoir layers may comprise bladders, which can easily contract and expand contingent upon the held amount of liquid. In one embodiment, reservoir layers store liquids for cleaning. Alternatively, the absorbent layers may be pretreated with surfactants that mix with any liquid. Suitable absorbent layers are known to one skilled in the relevant art. Electrofluidic textile layers are described herein.

Figure 14D:
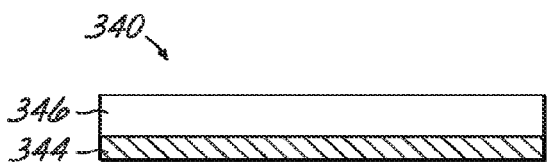
Figure 14E:
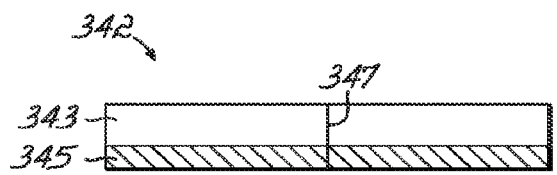
Figure 14F:
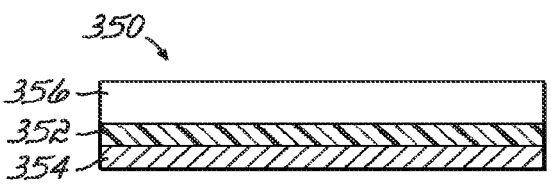
Figure 14G:
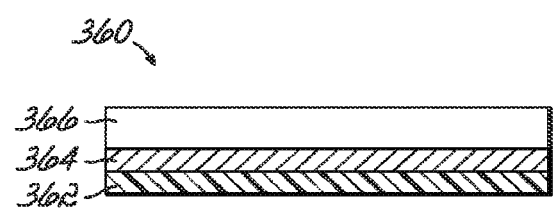
Figure 14H:
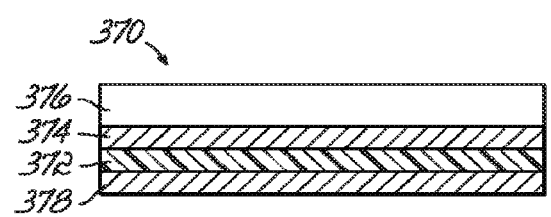
Figure 14I:
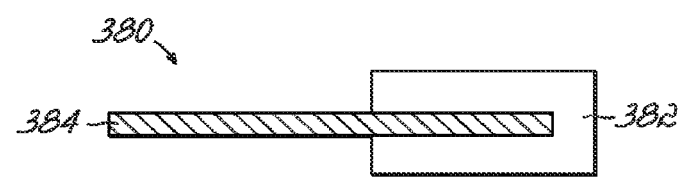

In FIG. 14A, a removable cleaning pad 310 consists of an absorbent 312. In FIG. 14B, a removable cleaning pad 320 is made of electrofluidic textile 324. In FIG. 14C, the removable cleaning pad 130 is made of absorbent layer 134 and electrofluidic textile 136. In FIG. 14D, a removable cleaning pad 340 is made of a reservoir 346 and an electrofluidic textile 344. In FIG. 14E, a removable cleaning pad 342 includes a reservoir 343 and an absorbent layer 345 that is divided by a partition 347. FIG. 14F, a removable cleaning pad 350 is comprised of a reservoir 356, an absorbent layer 352, and an electrofluidic textile 354. In FIG. 14G, a removable cleaning pad 360 is comprised of a reservoir 366, an electrofluidic textile 364, and an absorbent 362. In FIG. 14H, a removable cleaning pad 370 is comprised of a reservoir 376, an electrofluidic textile 374, an absorbent 372, and an electrofluidic textile 378 in which the absorbent 372 is arranged between that electrofluidic textiles 374, 378. In FIG. 14I, a cleaning pad 380 may include a reservoir 382 at one end of an electrofluidic textile 384.

Figure 15:
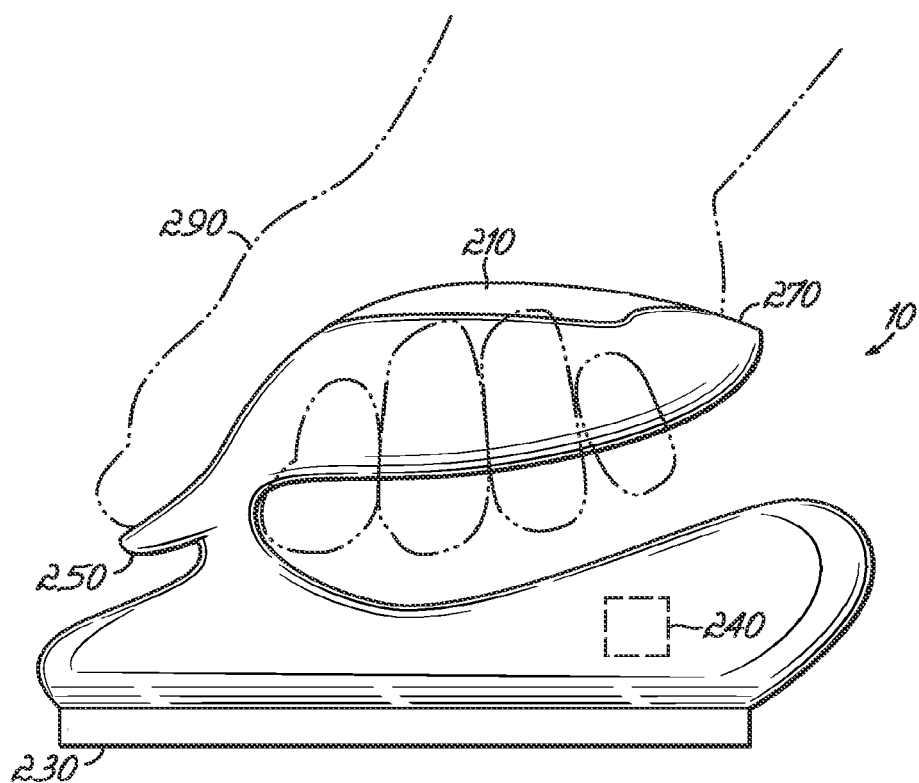
FIG. 15 is a perspective view of a cleaning device in accordance with an embodiment of the invention.

With reference to FIG. 15 and in accordance with an alternative embodiment of the invention, a cleaning implement or device 200 consists of a handle 270, a cleaning pad 230, and a control unit 240. Handle 270 is sized to be gripped by an operator's hand 290. A control unit 240, which includes a power supply, is located inside handle 270. A sensor 210, which may be a capacitance sensor, can activate/deactivate the power to control unit 240. A release mechanism 250 is attached to the handle 270. The operation of device 200 is the same as, or similar to, the operation of device 100. Device 200 is sized such that it can be held with one hand and may be used to clean surfaces, for example, on stairs, shelves or tables.

The selection of devices 100, 200 may be dictated by a need to clean surfaces of different sizes and types.

Figure 16:
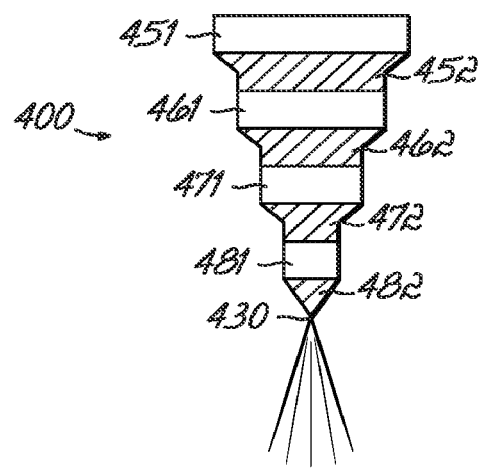
FIG. 16 is a diagrammatic view of an embodiment of a liquid dispersal unit in accordance with an embodiment of the invention.

With reference to FIG. 16 and in accordance with an alternative embodiment of the invention, a liquid dispersal unit 400 includes alternating electrofluidic textiles layers 452, 462, 472, 482 and reservoir layers 451, 461, 471, 481. When the power is activated, electrofluidic textile layers 452, 462, 472, 482 force liquid from each of the individual reservoir layers 451, 461, 471, 481, eventually resulting in the liquid being ejected at tip 430. Reservoir layer 451 may be attached to cleaning head 120 (FIG. 12) or may comprise a bottle or a bladder. The control unit 140 may control, for example, a valve element defined by textile layer 482 that is manipulated between a closed position and an open position for selectively dispensing the contained liquid onto a surface.

There may be many different reservoir configurations, which are referred to herein as the cleaning head, attached to the handle of the device.

Figure 17B:
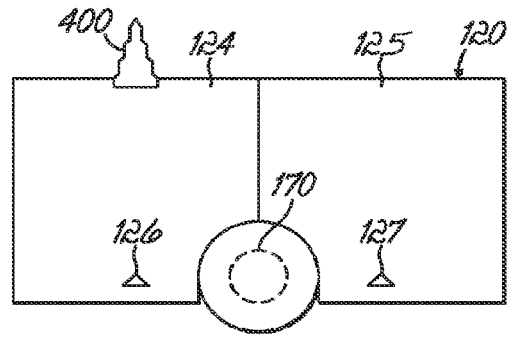
Figure 17C:
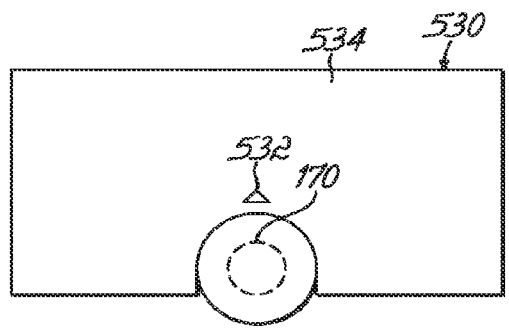
Figure 17D:
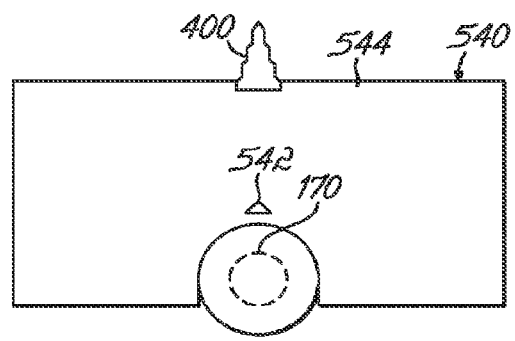
Figure 17E:
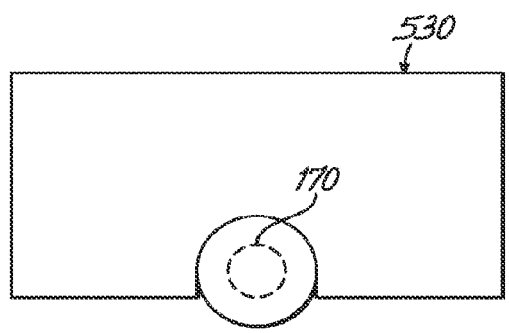

FIG. 17A illustrates cleaning head 120. FIG. 17B illustrates cleaning head 120 with the addition of a liquid dispersal unit, of which liquid dispersal unit 400 is representative, on reservoir 124. Liquid dispersal unit may be a mechanical motor or operate by another microfluidic technique known to one skilled in the relevant art for dispersing liquids. In FIG. 17C, a cleaning head 530 includes a reservoir 534 with release valve 532. In FIG. 17D, cleaning head 540 includes a reservoir 544 with a release valve 542 and a liquid dispersal unit, of which liquid dispersal unit 400 is representative. In FIG. 17E, a cleaning head 550 includes no reservoirs.

Figure 18:
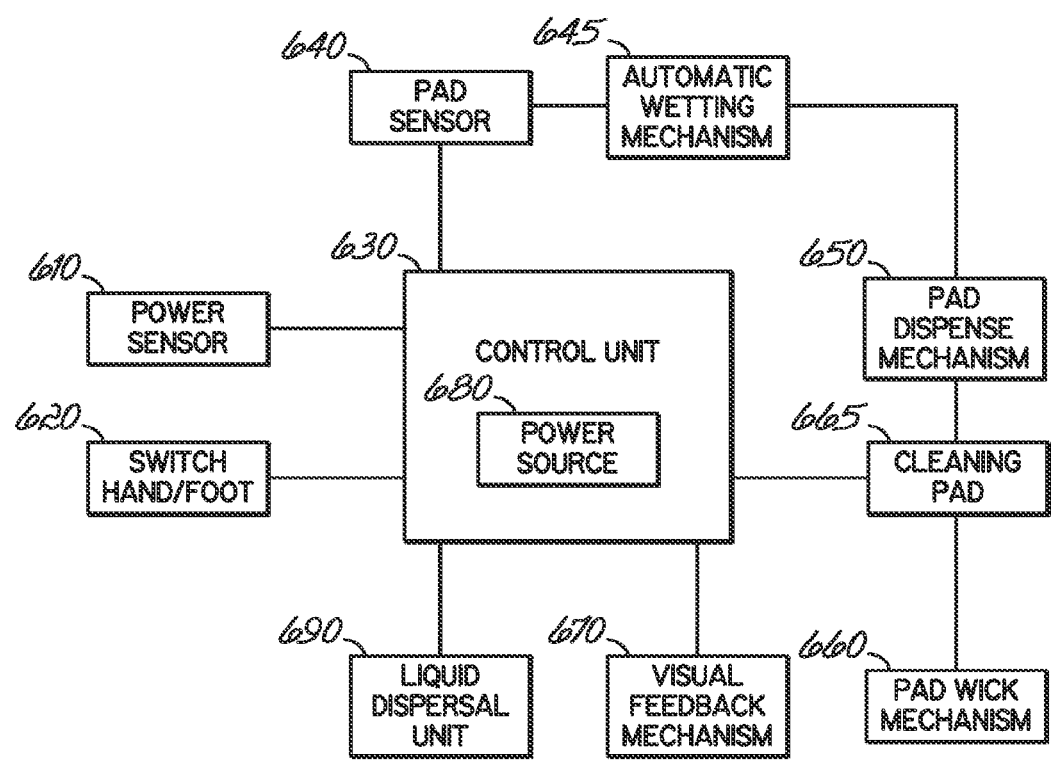
FIG. 18 is a diagrammatic view illustrating the functionality of a control unit for use with the cleaning devices of FIGS. 12 and 15.

With reference to FIG. 18 and in accordance with an embodiment of the invention, the control unit 630 may be switched on by a switch 620 or by a sensor 610 that detects that an operator (not shown) has grabbed a certain portion of the handle of the device. Sensor 610 may be any of a variety of sensors all known to one skilled in the relevant art such as a capacitance sensor, an induction sensor, or a heat sensor. The power for control unit 630 is supplied from a power source 680. In one embodiment, the power source 680 may be a rechargeable battery. Alternatively, the power source 680 may be a non-rechargeable battery, solar power in conjunction with a battery, or electromechanical.

Control unit 630 is electrically coupled with a visual feedback mechanism 670, a pad sensor 640, a liquid dispersal unit 690 and, through pad 665, a pad wick mechanism 660 and a pad dispense mechanism 650. Visual feedback mechanism 670 may be a coloration change in pad 665. When power source 680 is activated, the pad 665 changes color depending on the liquid being used. This may be done with dyes, but may also be accomplished by making pad 665 from a textile that change colors when wetted. The visual feedback mechanism 670 may be an LED that, when power source 680 is activated, lights up to inform the consumer that the system is on. When liquid levels get to a pre-determined level, the LED will flash, thus informing the consumer it is time to get more liquid or to empty a reservoir. Pad sensor 640 helps control unit 630 run the automatic wetting mechanism 645. Automatic wetting mechanism 645 activates the pad dispense mechanism 650 when pad sensor 640 senses that the pad 665 does not have enough liquid.

Further details and embodiments of the invention will be described in the following examples.

EXAMPLE 1

A woven metal wire mesh was coated with dodecane oil and a droplet of water placed on the surface. The water droplet remained stable on the surface. A voltage was applied between the metal mesh and water. Upon application of voltage, the water droplet was observed to immediately wet through the metal mesh. Upon removing the voltage, the water droplet was observed to remain wetted through the metal mesh.

EXAMPLE 2

A non-woven acrylic textile was coated with an aluminum electrical conductor via vacuum evaporation. The metallized textile was then coated with hydrophobic Parylene C via vapor deposition. A droplet of water was placed on the Parylene C surface and remained stable. A voltage was applied between the textile and water. Upon application of voltage, the water droplet was observed to immediately wet through the textile. Upon removing the voltage, the water droplet was observed to remained wetted through the textile.

EXAMPLE 3

A non-woven acrylic textile was coated with a conductive polymer (PEDOT) coating via liquid deposition. The textile was then coated with hydrophobic Parylene C via vapor deposition. Dipping the textile in a dilute solution of amorphous Teflon further increased the hydrophobicity of the textile. The sample was then dried. A droplet of water was placed on the surface and remained stable. If the textile was tilted, the water droplet was observed to rolled off the textile. A voltage was applied between the textile and water. Upon application of voltage, the water droplet was observed to immediately increase wetting of the textile. For low voltages, the wetting was reversible (i.e. no capillary wetting into the space within the textile). Applying voltage was observed hold the water droplet to the textile, even if the textile was tilted.

EXAMPLE 4

The textile of Example 3 was tested with addition of dodecane. It was observed that a film of dodecane allowed the textile to reversibly wet through all voltage levels.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Within the spirit of the invention proper fundamental configurations for EFT devices have been described and their applicability and specific design for numerous applications are readily contained within the invention. Non-limiting examples of specific EFT applications and designs include: mopping devices, sweeping devices, cleaning instruments, towels, water filters, feminine hygiene products, personal care products, diapers, liners, personal cleaning products, vaporizers, humidifiers, air purifiers, inhalers, training garments, bibs, exercise wear, military clothing, defogging instruments, odor-reducing devices, wipes, skin cleaning products, skin treating products, bandages, wound dressings, hazardous spill cleaning, blood filtration, biomedical valves, biomedical membranes, biomedical pumps, non-mechanical pumps, non-mechanical valves, cooling garments, heating garments, as an electrowetting scaffold for flexible electrowetting displays, and a variety of other existing or new applications utilizing the EFT principles described herein. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A method of manipulating a fluid with a porous web of electrofluidic fibers, the method comprising:
    applying a first bias voltage to a conductive core of each of the electrofluidic fibers in the porous web effective to remove a fluid from a surface; and
    applying a second bias voltage to the conductive core of the electrofluidic fibers effective to transfer the fluid from a first reservoir onto the surface.

2. The method of claim 1 wherein the first bias voltage is applied to a first layer of the electrofluidic fibers to absorb the fluid from the surface, and further comprising:
    applying a third bias voltage to the conductive core of a second layer of the electrofluidic fibers effective to transfer the fluid from the first layer to the second layer.

3. The method of claim 1 further comprising:
    transferring the removed fluid from the porous web to a second reservoir.

4. The method of claim 1 further comprising:
    transferring the removed fluid to an absorber such that an exposed surface of the porous web is dry to the touch.

5. A method of manipulating a fluid with a porous web of electrofluidic fibers, the method comprising:
    applying a first bias voltage to a conductive core of each of the electrofluidic fibers in the porous web effective to remove a fluid from a surface; and
    applying a series of second bias voltages to the conductive core of the electrofluidic fibers in different portions of the porous web effective to move the fluid within a plane of the porous web.

6. The method of claim 5 further comprising:
    transferring the removed fluid to an absorber such that an exposed surface of the porous web is dry to the touch.

7. An electrowetting method of manipulating an electrowetting fluid with a porous web of electrofluidic fibers, the method comprising:
    applying a first bias voltage to a conductive core of each of the electrofluidic fibers in the porous web effective to remove a first fluid from a surface; and
    wetting the surface with a polar fluid, different from the first fluid, before applying the first bias voltage.

8. The method of claim 7 further comprising:
    transferring the removed first fluid to an absorber such that an exposed surface of the porous web is dry to the touch.

* * * * *